United States Patent
Shono et al.

(10) Patent No.: US 6,202,010 B1
(45) Date of Patent: Mar. 13, 2001

(54) VEHICLE HEIGHT ADJUST CONTROL APPARATUS AND METHOD

(75) Inventors: Shoichi Shono, Nishikamo-gun; Atushi Sato, Susono; Yoshiyuki Hashimoto, Anjo, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/166,077

(22) Filed: Oct. 5, 1998

(30) Foreign Application Priority Data

Jan. 13, 1998 (JP) .................................................. 10-005167

(51) Int. Cl.$^7$ .................................................. B60G 21/06
(52) U.S. Cl. ................................ 701/37; 180/41; 280/5.5; 280/6.157; 280/5.514; 280/124.157
(58) Field of Search .......................... 701/37, 48; 180/41; 307/116, 118; 280/5.5, 5.514, 6.157, 124.157

(56) References Cited

U.S. PATENT DOCUMENTS 5,083,275 * 1/1992 Kawagoe et al. ........................ 701/37

FOREIGN PATENT DOCUMENTS

| 62-241716 | 10/1987 | (JP) . |
| 2-3515 | 2/1989 | (JP) . |
| 2-57415 | 2/1990 | (JP) . |
| 459415 | 2/1992 | (JP) . |
| 7-31418 | 6/1995 | (JP) . |

* cited by examiner

Primary Examiner—William A. Cuchlinski, Jr.
Assistant Examiner—Yonel Beaulieu
(74) Attorney, Agent, or Firm—Oliff & Berridge PLC.

(57) ABSTRACT

A vehicle height adjust control apparatus and method precisely performs vehicle height adjustment while preventing unnecessary vehicle height adjustment. In the apparatus, a microcomputer compares the amount of shift of a vehicle height detected by a vehicle height sensor with a first predetermined value. If the amount of shift is greater than the first predetermined value, the microcomputer integrates the amount of shift. The integral of the amount of shift is compared with a second predetermined value. If the integral is greater than the second predetermined value, the microcomputer determines that vehicle height adjustment should be started. The first and/or second predetermined values used in an initial period immediately after an engine is started are smaller than the first and/or second predetermined values used after the initial period. The sensitivity to vehicle height shift in determining whether to start vehicle height adjustment is thus enhanced during the initial period immediately after the engine is started, so that vehicle height adjustment is promptly performed during the initial period, during which there is a high likelihood that a vehicle height change occurred during the stop of the vehicle.

18 Claims, 13 Drawing Sheets

VEHICLE HEIGHT ADJUST CONTROL APPARATUS AND METHOD

INCORPORATION BY REFERENCE

The disclosure of Japanese Patent Application No. HEI 10-5167 filed on Jan. 13, 1998 including the specification, drawings and abstract is incorporated herein by reference in its entirety.

BACKGROUND OF THE INVENTION

1. Field of Invention

The present invention relates to a vehicle height adjust control apparatus and method for adjusting an actual vehicle height to a predetermined target vehicle height.

2. Description of Related Art

A vehicle height adjust control apparatus as described in, for example, Japanese Patent Application Laid-Open No. HEI 2-3515, includes actuators capable of changing a vehicle height, and a vehicle height detection device for detecting the vehicle height. The apparatus performs vehicle height adjust control by integrating the amount of shift of the detected vehicle height from a predetermined target vehicle height and, when the integral of the amount of shift exceeds a predetermined value, controls the actuators so that the detected vehicle height becomes equal to the target vehicle height. This manner of control avoids starting a vehicle height adjusting operation in response to a temporary vehicle height change, thereby preventing unnecessary vehicle height adjustment.

Japanese Patent Application Laid-Open No. SHO 62-0241716 describes a technology wherein the detected vehicle height sampling time is reduced when a detected vehicle height is out of an allowable range around a target vehicle height, in comparison with a case where the detected vehicle height is within the allowable range. This prevents overshoot of the vehicle height resulting from a delay of the vehicle height detection during vehicle height adjustment and also prevents unnecessary performing of vehicle height adjusting operations due to an excessively high sensitivity in the vehicle height detection.

However, these conventional apparatus do not consider either the vehicle height changes while the vehicle is stopped or the difference between the vehicle height changing rate during the vehicle body raising control and the vehicle height changing rate during the vehicle body lowering control, and therefore suffer from several problems. That is, if the vehicle is stopped with the engine turned off, there is a high possibility of a vehicle height change due to a change in the baggage weight on the vehicle, or a high possibility of a vehicle height reduction due to a temperature reduction of fluid in an apparatus wherein hydraulic actuators and the like are used. Considering such circumstances, it is desirable to adjust the vehicle height to a target vehicle height more quickly at the time of starting the engine than during the running of the vehicle, If it is determined whether to start vehicle height adjustment on the basis of the integral of the amount of shift of the vehicle height as in the aforementioned conventional apparatus, it requires an undesirably long time to start the vehicle height adjustment during an initial period following starting of the engine.

Additionally, the vehicle body is raised against the vehicle's own weight by operating the actuators, whereas the vehicle body can be lowered by using the vehicle's own weight. Therefore, the vehicle height changing rate becomes greater when the vehicle height is being reduced than when the vehicle height is being increased. Consequently, vehicle height adjust control apparatus that do not consider the vehicle height changing rate as in the aforementioned apparatus have a problem as there is a high possibility of downward overshoot of the vehicle body during the lowering control of the vehicle body.

SUMMARY OF THE INVENTION

The invention has been achieved by taking into account the vehicle height changes while the vehicle is stopped and the difference between the vehicle height changing rate during the raising control and the vehicle height changing rate during the lowering control.

It is an object of the present invention to provide a vehicle height adjust control apparatus capable of performing precise vehicle height adjustment when a vehicle height change is likely to exist and when the existence of a vehicle height change is less likely.

It is another object of the invention to provide a vehicle height adjust control apparatus that substantially prevents vehicle height overshoot resulting from the difference between the vehicle height changing rate during the raising control and the vehicle height changing rate during the lowering control.

According to one aspect of the invention, there is provided a vehicle height adjust control apparatus including an actuator capable of changing a vehicle height, a vehicle height detection device for detecting the vehicle height, a start determining device for determining whether to start vehicle height adjustment by comparing the vehicle height detected by the vehicle height detection device with a predetermined target vehicle height, and a vehicle height adjust control device for adjusting the vehicle height. If it is determined that vehicle height adjustment is to be started, the vehicle height adjust control device controls the actuator so that the vehicle height detected by the vehicle height detection device becomes substantially equal to the target vehicle height. During an early period immediately after an engine is started, the start determining device uses a threshold that is different from a threshold used after the early period to make determinations regarding the start of the vehicle height adjustment.

In the vehicle height adjust control apparatus, during an early period immediately after the start of the engine, the start determining device determines that vehicle height adjustment is to be started, even if the vehicle height is only slightly shifted from the target vehicle height. After the early period, on the other hand, the start determining device makes the vehicle height adjustment starting determination only if the vehicle height is considerably shifted from the target vehicle height. That is, the sensitivity to vehicle height shift in determining whether to start vehicle height adjustment is relatively high during the early period, and the sensitivity is relatively low after the early period. Therefore, the vehicle height adjust control apparatus of the invention prevents unnecessary vehicle height adjustment in response to a temporary vehicle height change in a normal occasion, and quickly performs vehicle height adjustment during the early period immediately after the engine is started, during which there is a high probability of a vehicle height change occurring during the stop of the vehicle. Consequently, vehicle height adjustment is precisely performed when it is necessary.

The vehicle height adjust control apparatus according to the first aspect of the invention may further have the following features. That is, the start determining device may compare an integral of the amount of shift of the vehicle height detected by the vehicle height detection device from the target vehicle height, which amount of shift is greater than a first predetermined value, with a second predetermined value. If the integral of the amount of shift is greater than the second predetermined value, the start determining device determines that the vehicle height adjustment is to be started. The first predetermined value used during the early period is smaller than the first predetermined value used after the early period. Therefore, during the early period immediately after the start of the engine, the start determining device integrates the amount of shift of the detected vehicle height from the target vehicle height if the amount of shift is greater than a relatively small value. After the early period, the start determining device integrates the amount of shift if the amount of shift becomes greater than the value that is greater than the small value used during the early period. Consequently, during the early period, the start determining device makes the vehicle height adjustment starting determination even for a relatively small shift of the vehicle height from the target vehicle height. After the early period, the start determining device makes the vehicle height adjustment starting determination only for a relatively large shift of the vehicle height from the target vehicle height.

The vehicle height adjust control apparatus may also have the following features. That is, the start determining device compares an integral of the amount of shift of the vehicle height detected by the vehicle height detection device from the target vehicle height with a second predetermined value. If the integral is greater than the second predetermined value, the start determining device determines that the vehicle height adjustment is to be started. The second predetermined value used during the early period is smaller than the second predetermined value used after the early period. Therefore, during the early period, the start determining device makes the vehicle height adjustment starting determination even if the integral of the amount of shift is relatively small. After the early period, the start determining device does not make the vehicle height adjustment starting determination unless the integral of the amount of shift becomes relatively large. That is, the sensitivity to vehicle height shift in determining whether to start vehicle height adjustment is enhanced during the early period, and the sensitivity is reduced after the early period. Consequently, vehicle height adjustment is precisely performed when it is necessary, as described above.

The start determining device may compare the amount of shift of the vehicle height with a first predetermined value, and the start determining device may use as the integral, a value obtained through integration of the amount of shift of the vehicle height that is greater than the first predetermined value. Therefore, temporary small vehicle height changes are excluded from the integrating operation, thereby preventing unnecessary vehicle height adjustment in response to small oscillations of the vehicle body, or signal noise contamination, and the like.

The vehicle height adjust control apparatus may also have the following features. That is, the start determining device counts a number of times that the amount of shift of the vehicle height detected by the vehicle height detection device from the target vehicle height exceeds a first predetermined value. If the counted number of times becomes greater than a third predetermined value, the start determining device determines that vehicle height adjustment is to be started. The first predetermined value used during the early period is smaller than the first predetermined value used after the early period. Alternatively, or in addition, the third predetermined value used during the early period is smaller than the third predetermined value used after the early period.

With such a start determining device, the sensitivity to vehicle height shift in determining whether to start vehicle height adjustment is enhanced during the early period, and the sensitivity is reduced after the early period, as in the foregoing examples. Consequently, vehicle height adjustment is precisely performed when it is necessary, as described above.

According to another aspect of the invention, there is provided a vehicle height adjust control apparatus including an actuator capable of changing a vehicle height, a vehicle height detection device for detecting the vehicle height, a start instruction device for outputting an instruction to start vehicle height adjustment, a vehicle height changing control device for changing the vehicle height by operating the actuator so that the vehicle height detected by the vehicle height detection device becomes substantially equal to the target vehicle height, and an end control device for ending the changing of the vehicle height by stopping operation of the actuator. The vehicle height changing control device is responsive to the instruction from the start instruction device. The end control device activates when the vehicle height detected by the vehicle height detection device becomes substantially equal to the target vehicle height. The end control device includes a first end control device used during vehicle height increasing control for ending the changing of the vehicle height when the vehicle height detected by the vehicle height detection device becomes greater than a value that is less by a fourth predetermined value than the target vehicle height, and a second end control device used during vehicle height decreasing control for ending the changing of the vehicle height when the vehicle height detected by the vehicle height detection device becomes less than a value that is greater by a fifth predetermined value than the target vehicle height. The fifth predetermined value is greater than the fourth predetermined value. Optionally, the start instruction device may include a setting element for changing the target vehicle height, and a target vehicle height changing device for changing the target vehicle height in response to an operation of the setting element and outputting the instruction to start the vehicle height adjustment. Furthermore, the start instruction device may also include a count device for comparing the amount of the vehicle height detected by the vehicle height detection device from the target vehicle height with a first predetermined value, and counting a number of times that the amount of shift exceeds the first predetermined value, and a start determining device for outputting the instruction to start the vehicle height adjustment if the counted number of times becomes greater than a third predetermined value.

Therefore, the actual vehicle height is farther apart from the target vehicle height when the vehicle height decreasing adjustment is ended by the second end control device than when the vehicle height increasing adjustment is ended by the first end control device. This effectively minimizes the overshoot in the vehicle height increasing and reducing control operations due to the weight of the vehicle body, since the vehicle height changing rate during the vehicle body lowering control operation is greater than the vehicle height changing rate during the vehicle body raising control operation. Consequently, vehicle height adjustment is precisely performed.

According to a further aspect of the invention ,there is provided a method of vehicle height adjustment control, comprising: detecting a vehicle height; comparing the vehicle height detected with a predetermined target vehicle height; detecting a vehicle engine start; comparing the amount of shift between the detected vehicle height and the target vehicle height against a first threshold during a first period immediately after detection of vehicle engine start; start controlling adjustment of the vehicle height so that the detected vehicle height becomes substantially equal to the target vehicle height when the amount of shift is greater than the first threshold; comparing the amount of shift between the detected vehicle height and the target vehicle height against a second threshold during a second period after lapse of the first period, the first threshold being smaller than the second threshold; and start controlling adjustment of the vehicle height so that the detected vehicle height becomes substantially equal to the target vehicle height when the amount of shift is greater than the second threshold.

According to yet a further aspect of the invention, there is provided a method of vehicle height adjustment control, comprising: detecting a vehicle height; comparing the vehicle height detected with a predetermined target vehicle height; starting vehicle height adjustment control in response to an instruction to start vehicle height adjustment so that the vehicle height detected by the vehicle height detector becomes substantially equal to the target vehicle height; ending vehicle height adjustment during a height increasing operation by stopping the operation when the detected vehicle height becomes greater than a value that is less by a first predetermined value than the target vehicle height; and ending vehicle height adjustment during a height decreasing operation by stopping the operation when the detected vehicle height becomes less than a value that is less by a second predetermined value than the target vehicle height, the second predetermined value being greater than the first predetermined value.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
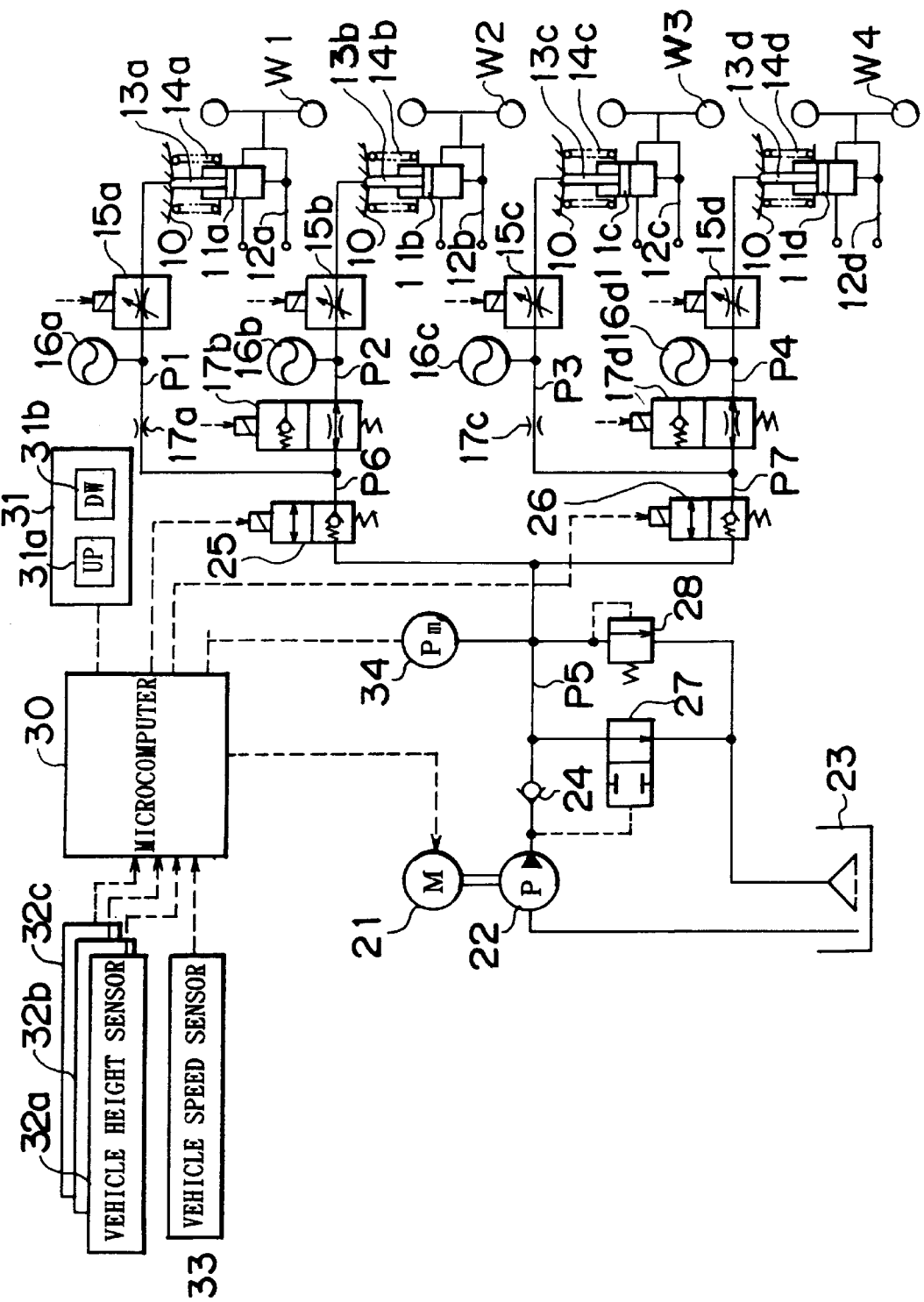
FIG. 1 is a schematic diagram of the overall vehicle height adjust control apparatus according to a preferred embodiment of the invention.

Preferred embodiments of the present invention will be described in detail hereinafter with reference to the accompanying drawings. FIG. 1 is a schematic illustration of a vehicle height adjust control apparatus according to a preferred embodiment of the invention.

The vehicle height adjust control apparatus has hydraulic cylinders $11a$–$11d$ that form hydraulic actuators for setting vehicle heights, near left and right front wheels W1, W2 and left and right rear wheels W3, W4, respectively. Each of the hydraulic cylinders $11a$–$11d$ is connected at its lower end to a lower arm $12a$–$12d$ connecting to the corresponding one of the wheels W1–W4. A piston rod $13a$–$13d$ of each hydraulic cylinder $11a$–$11d$ protrudes from an upper surface thereof. Upper end portions of the piston rods $13a$–$13d$ are fixed to a vehicle body 10. Hydraulic fluid is supplied to and discharged from the hydraulic cylinders $11a$–$11d$ through fluid passages P1–P4, respectively. In accordance with supply and discharge of hydraulic fluid, the hydraulic cylinders $11a$–$11d$ change the vehicle height at the respective wheel positions.

Coil springs $14a$–$14d$ are disposed between the vehicle body 10 and the hydraulic cylinders $11a$–$11d$, respectively. The fluid passages P1–P4 are provided with variable orifices $15a$–$15d$, respectively. Accumulators $16a$–$16d$ are connected to the fluid passages P1–P4, respectively. In cooperation with the coil springs $14a$–$14d$, the variable orifices $15a$–$15d$ and the accumulators $16a$–$16d$, the hydraulic cylinders $11a$–$11d$ elastically support the vehicle body 10 relative to the wheels W1–W4, and also function as shock absorbers for damping oscillations of the vehicle body 10. The variable orifices $15a$–$15d$ are electrically controlled so as to vary their orifice openings. The control of the orifice openings of the variable orifices $15a$–$15d$ is not directly related to the invention, and will not be described.

The fluid passages P1, P2 and the fluid passages P3, P4 are connected, at their ends opposite from the hydraulic cylinders $11a$, $11b$ and $11c$, $11d$, to common fluid passages, P6, P7, respectively. Therefore, hydraulic fluid is collectively supplied to and discharged from the hydraulic cylinders $11a$, $11b$ through the fluid passages P1, P2, and hydraulic fluid is collectively supplied to and discharged from the hydraulic cylinders $11c$, $11d$ through the fluid passages P3, P4. The fluid passages P2, P4 are provided with gate valves $17b$, $17d$ formed by electromagnetic valves, respectively. The gate valves $17b$, $17d$ are in a conveying state as indicated in FIG. 1 when not energized, and they are switched to a non-conveying state when energized. The gate valves $17b$, $17d$ are energized when the vehicle body 10 rolls, for example, at the time of cornering or turning, so as to prevent communication between the hydraulic cylinders $11a$ and $11b$ and communication between the hydraulic cylinders $11c$ and $11d$, respectively. The operation of the gate valves $17b$, $17d$ is not directly relevant to the invention, and the description below will be made on the assumption that the gate valves $17b$, $17d$ are always in the conveying state as indicated in FIG. 1. The fluid passages P1, P3 are provided with invariable orifices $17a$, $17c$, respectively, for providing the fluid passages P1, P3 with a passage resistance equivalent to that provided by orifice openings that are formed by the gate valves $17b$, $17d$ when in the conveying state.

A hydraulic pressure supply-discharge device for supplying hydraulic fluid to and discharging it from the hydraulic cylinders 11a–11d has a hydraulic pump 22 that is driven by an electric motor 21. The hydraulic pump 22 draws hydraulic fluid from a reservoir tank 23, and ejects it into a fluid passage P5 through a check valve 24. The fluid passage P5 divides into fluid passages P6, P7. The branch fluid passage P6 is connected to the connecting point of the fluid passages P1, P2. The branch fluid passage P7 is connected to the connecting point of the fluid passages P3, P4. The fluid passages P6, P7 are provided with leveling valves 25, 26 that are formed by electromagnetic valves, respectively. The leveling valves 25, 26 remain in a non-conveying state as indicated in FIG. 1 when not energized, and they are switched to a conveying state when energized. If the hydraulic pressure in the fluid passages P1–P4 becomes abnormally high, the leveling valves 25, 26 allow discharge of hydraulic fluid from the fluid passages P1–P4 into the fluid passage P5 for protection of the apparatus even while they are in the non-conveying state.

A discharge valve 27 and a relief valve 28 are disposed between the fluid passage P5 and the reservoir tank 23. The discharge valve 27 is normally kept in a conveying state, and mechanically switched to a non-conveying state when the ejecting pressure of the hydraulic pump 22 increases. The passage area of the discharge valve 27 when the discharge valve 27 is kept in the conveying state is at least twice as large as the passage area of the leveling valves 25, 26 when they are in the conveying state. The relief valve 28 is normally kept in a nonconveying state. Only when the hydraulic pressure in the fluid passage P5 becomes very high is the relief valve 28 switched to a conveying state to let hydraulic fluid out of the fluid passage P5 into the reservoir tank 23 for protection of the apparatus.

The electric motor 21 and the leveling valves 25, 26 are connected to a microcomputer 30 that forms an electric control device. The microcomputer 30 executes a main program illustrated in FIG. 2 (including subroutines illustrated in FIGS. 3 through 9), a target vehicle height changing program illustrated in FIG. 10, and a drive control program illustrated in FIG. 11 cyclically repeated at predetermined short time interval, thereby controlling the supply and discharge of hydraulic fluid with respect to the hydraulic cylinders 11a–11d. The microcomputer 30 is connected to a target vehicle height setting element 31, vehicle height sensors 32a–32c, a vehicle speed sensor 33 and a pressure sensor 34.

The target vehicle height changing switch 31 is an element that is operated by an occupant to increase or reduce the vehicle height. The target vehicle height changing switch 31 includes an up-setting element 31a for increasing the vehicle height from a present level, and a down-setting element 31b for reducing the vehicle height from a present level. The vehicle height sensors 32a, 32b are disposed between the vehicle body 10 and the lower arms 12a, 12b at the left and right front wheels W1, W2, respectively. Each of the vehicle height sensors 32a, 32b detects the height of the vehicle body 10 at the left or right front wheel W1, W2 relative to a road surface (or an under-spring member), and outputs a detection signal indicating the actual vehicle height Hf1, Hf2. The vehicle height sensor 32c is disposed at a transversely middle position in a rear portion of the vehicle body 10, between the vehicle body 10 and a frame (corresponding to an under-spring member not shown) connecting the lower arms 12c and 12d. The vehicle height sensor 32c detects the height of the vehicle body 10 at the transversely middle position in the rear portion of the vehicle, relative to the road surface (or the under-spring member), and outputs a detection signal indicating the actual vehicle height Hr. The vehicle speed sensor 33 detects a vehicle speed V and outputs a detection signal indicating the vehicle speed V. The pressure sensor 34 detects a fluid pressure Pm of hydraulic fluid ejected from the hydraulic pump 22, and outputs a detection signal indicating the fluid pressure Pm.

The operation of this embodiment will be described. When an ignition switch (not shown) is turned on, the microcomputer 30 executes a program (not illustrated) to initially set "0" in various flags used in the programs described below, and then starts to execute the main program illustrated in FIG. 2, the target vehicle height changing program illustrated in FIG. 10, and the drive control program illustrated in FIG. 11 cyclically at predetermined short time intervals.

Overall Operation

First, the overall operation will be briefly described. By the process of steps 106–114 in the main program of FIG. 2, the microcomputer 30 receives inputs of the signals of vehicle heights Hf1, Hf2, Hr from the vehicle height sensors 32a–32c, and calculates actual vehicle heights Hf, Hr of the front and rear portions of the vehicle body 10 from the input signals of actual vehicle heights Hf1, Hf2, Hr, and obtains actual vehicle heights Hff, Hrr by low-pass filtering the actual vehicle heights Hf, Hr. Subsequently, through the front start determining routine of step 116 and the rear start determining routine of step 118, the microcomputer 30 calculates amounts of shift of the actual vehicle heights Hf, Hr (or Hff, Hrr) of the front and rear portions of the vehicle from respective target vehicle heights Hf*, Hr* by integration. If either one of the amounts of shift is great, the microcomputer 30 outputs an instruction to raise or lower the front or rear portion of the vehicle. If the up-setting element 31a or the down-setting element 31b of the target vehicle height changing switch 31 is operated, the microcomputer 30 changes the target vehicle heights Hf*, Hr* and outputs an instruction to raise or lower the front and rear portions of the vehicle body 10 in a process of steps 602–622 in the target vehicle height changing program of FIG. 10. Furthermore, if the vehicle is started after a stop with the target vehicle heights Hf*, Hr* set to a low level, the microcomputer 30 changes the target vehicle heights Hf*, Hr* to a normal level, and outputs an instruction to raise the front and rear portions of the vehicle body 10 in the process of step 624–636 in the target vehicle height changing program of FIG. 10.

When the instruction for raising or lowering the front or rear portion of the vehicle body 10 is outputted, the microcomputer 30 operates the electric motor 21 and the leveling valve 25 or 26 to raise or lower the front or rear portion of the vehicle body 10. It is determined whether to end the raising or lowering operation, by execution of the front end determining routine of step 120 in FIG. 2 and the rear end determining routine of step 122 in FIG. 2. If the amount of shift of the actual vehicle heights Hf, Hr (or Hff, Hrr) from the respective target vehicle heights Hf*, Hr* is within a predetermined range, that is, if the actual vehicle heights Hf, Hr (or Hff, Hrr) become substantially equal to the target vehicle heights Hf*, Hr*, it is determined that the raising or lowering control should be ended. Following the determination, the microcomputer 30 stops the operation of the electric motor 21 and the leveling valves 25, 26 and thereby ends the raising or lowering of the front or rear portion of the vehicle body 10 through a process of steps 704–724 in the drive control program of FIG. 11.

During the vehicle height adjust control of the front and rear portions of the vehicle body 10, the microcomputer 30 checks for a state where vehicle height adjust control is impossible due to an abnormality in the electric motor 21, the hydraulic pump 22, the pressure sensor 34 or the like, oil exhaustion, an excessive load superimposed on the vehicle, a failure in the apparatus and the like. This is accomplished by executing the first check routine of step 124 and the second check routine of step 126 in the main program of FIG. 2. If such an abnormality is detected, the microcomputer 30 suspends vehicle height adjustment by the processing of steps 702, 726–734 in the drive control program of FIG. 11. In addition, the microcomputer 30 checks recovery of the electric motor 21 and the hydraulic pump 22 by the process of step 102, 128–132 in the main program of FIG. 2, including the fail recovery check routine of FIG. 132.

Normal Operation

An operation wherein the vehicle height is normally adjusted after no abnormality has been detected by execution of the first check routine and the second check routine will now be described. In this case, a fail flag FAIL and first and second stop flags STP1, STP2, which will be described below, have been set to "0". Therefore, the microcomputer 30 makes negative determinations in steps 102, 104 in FIG. 2, and proceeds to step 106.

In step 106, the microcomputer 30 receives inputs of the detection signals from the vehicle height sensors 33a–33c, the vehicle speed sensor 33 and the pressure sensor 34 indicating the vehicle heights Hf1, Hf2, Hr, the vehicle speed V and the fluid pressure Pm. In step 108, the microcomputer 30 calculates an actual vehicle height Hf=(Hf1+Hf2)/2) of the front portion of the vehicle body 10 by averaging the actual vehicle heights Hf1, Hf2. In step 110, the microcomputer 30 subjects the vehicle heights Hf, Hr of the front and rear portions of the vehicle body 10 to low-pass filtering, and sets the obtained values as actual vehicle heights Hff, Hrr.

Subsequently in step 112, the microcomputer 30 determines whether the vehicle speed V is greater than the predetermined vehicle speed $V_0$ (for example, 5 km/h). If the vehicle speed V is greater than the predetermined vehicle speed $V_0$, the microcomputer 30 sets the low-pass-filtered vehicle heights Hff, Hrr as actual vehicle heights Hf, Hr of the front and rear portions of the vehicle body 10 in step 114. If the vehicle speed V is not greater than the predetermined vehicle speed $V_0$, the microcomputer 30 does not execute step 114, but maintains the actual vehicle heights Hf, Hr of the front and rear portions of the of the vehicle body 10 determined in steps 106, 108. This process is provided for the following reasons. That is, the actual vehicle heights of the front and rear portions of the vehicle body 10 do not substantially change if the vehicle height is in a substantially stopped state, whereas during the running of the vehicle, the actual vehicle heights fluctuate over time so that it is preferred to perform the low-pass filtering. The actual vehicle heights Hf, Hr set depending on the vehicle speed V are used in the following operation.

Subsequently, the microcomputer 30 executes the front start determining routine of step 116, which is illustrated in detail in FIG. 3. After the front start determining routine is started in step 200 in FIG. 3, the microcomputer 30 calculates a vehicle height deviation ΔHf(=Hf*−Hf) by subtracting the detected actual vehicle height Hf of the front portion of the vehicle body 10 from the target vehicle height Hf* of the front portion thereof in step 202. The target vehicle height Hf* is set by execution of the target vehicle height changing program of FIG. 10, as described above.

After executing step 202, the microcomputer 30 determines in step 204 whether a front initial flag ILf is "0". The front initial flag ILf is set to "0" by the initial setting operation immediately after the ignition switch is turned on, as described above. Therefore, until the front initial flag ILf is set to "1" by a processing described below, the microcomputer 30 makes an affirmative determination in step 204, and sets a threshold Hfth to a predetermined value Hfth1 in step 206. After the front initial flag ILf has been set to "1", the microcomputer 30 makes a negative determination in step 204, and sets the threshold Hfth to a predetermined value Hfth2 in step 208. The predetermined values Hfth1, Hfth2 are predetermined positive values. The predetermined value Hfth1 is smaller than the predetermined value Hfth2.

After step 206 or 208, the microcomputer 30 determines in step 210 whether the absolute value |ΔHf| of the vehicle height deviation ΔHf calculated in step 202 is greater than the threshold Hfth. If the absolute value |ΔHf| is not greater than the threshold Hfth, the microcomputer 30 makes a negative determination in step 210, and immediately ends the execution of the front start determining routine in step 228.

Figure 2:
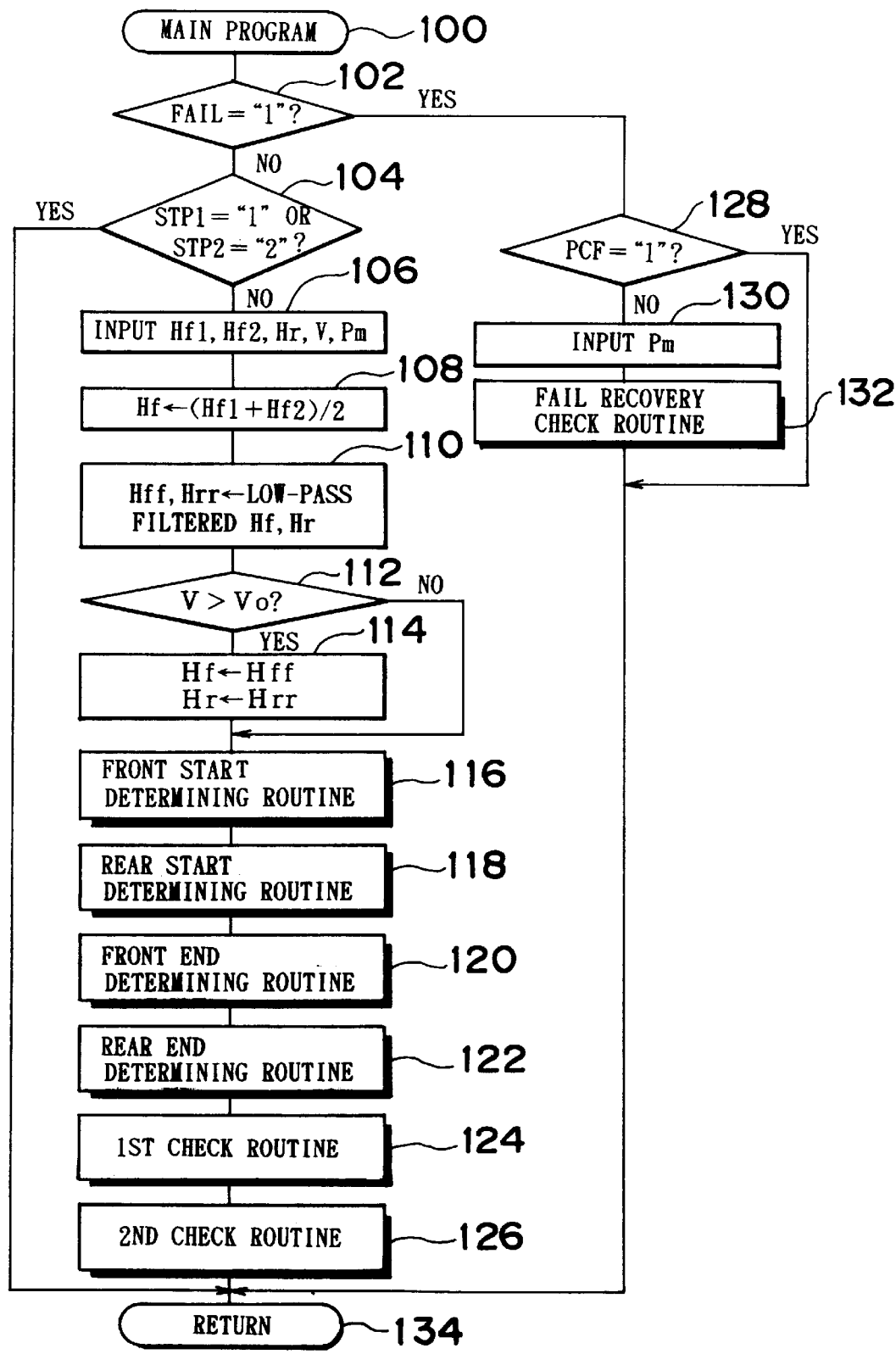
FIG. 2 is a flowchart illustrating a main program executed by the microcomputer shown in FIG. 1.

After that, the microcomputer 30 executes the rear start determining routine of step 118 in the main program of FIG. 2. As illustrated in detail in FIG. 4, after the rear start determining routine is started in step 240, the microcomputer 30 calculates a vehicle height deviation ΔHr (=Hr*−Hr) by subtracting the detected actual vehicle height Hr of the rear portion of the vehicle body 10 from the target vehicle height Hr* of the rear portion thereof in step 242. The target vehicle height Hr* is also set by execution of the target vehicle height changing program of FIG. 10, as described above.

After executing step 242, the microcomputer 30 determines in step 244 whether a rear initial flag ILr is "0". The rear initial flag ILr is also set to "0" by the initial setting operation immediately after the ignition switch is turned on, as described above. Therefore, until the rear initial flag ILr is set to "1", the microcomputer 30 makes an affirmative determination in step 244, and sets a threshold Hrth to a predetermined value Hrth1 in step 246. After the rear initial flag ILr has been set to "1", the microcomputer 30 makes a negative determination in step 244, and sets the threshold Hrth to a predetermined value Hrth2 in step 248. The predetermined values Hrth1, Hrth2 are determined positive values. The predetermined value Hrth1 is smaller than the predetermined value Hrth2. After step 246 or 248, the microcomputer 30 determines in step 250 whether the absolute value |ΔHr| of the vehicle height deviation ΔHr calculated in step 242 is greater than the threshold Hrth. If the absolute value |ΔHr| is not greater than the threshold Hrth, the microcomputer 30 makes a negative determination in step 250, and immediately ends the execution of the rear start determining routine in step 268.

Figure 11:
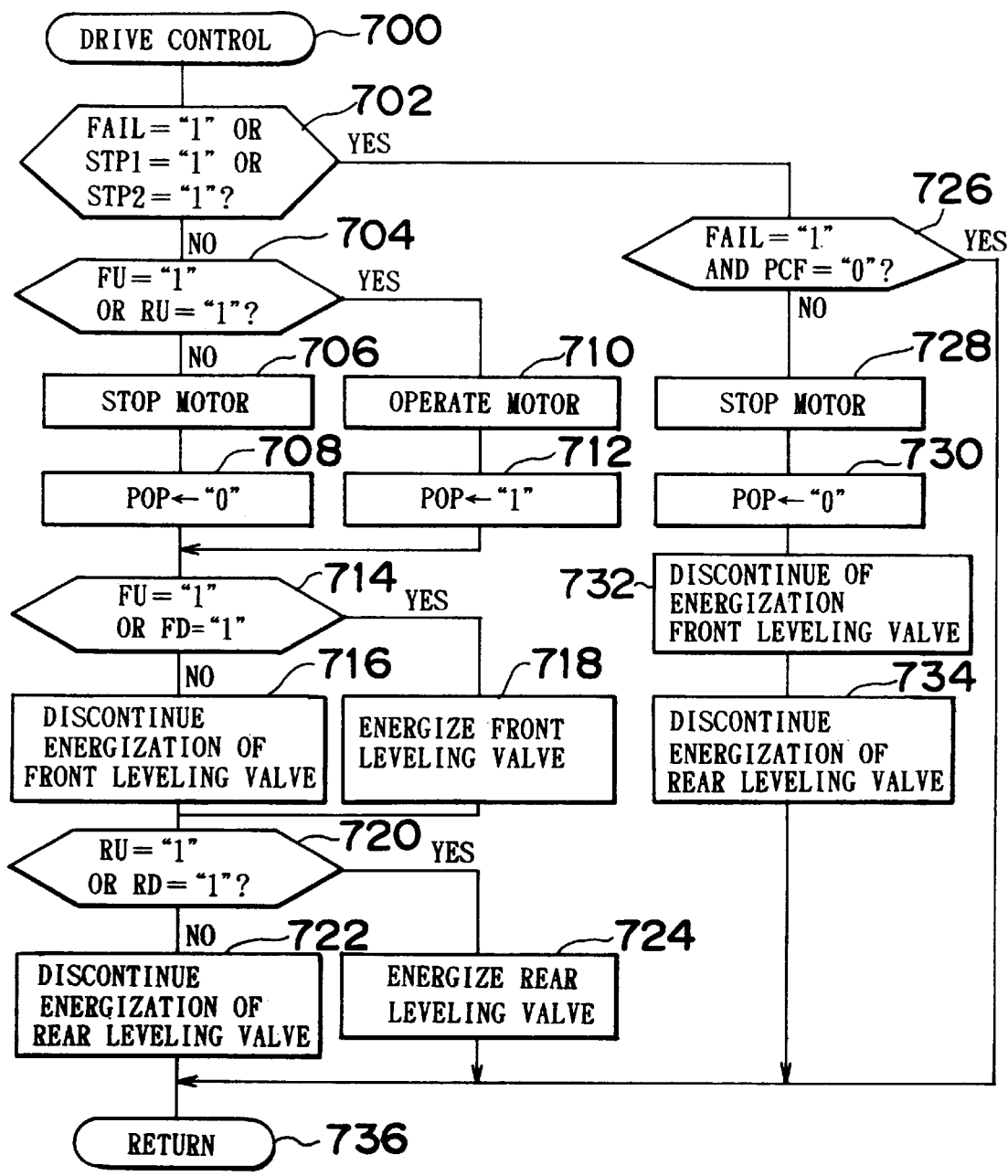
FIG. 11 is a flowchart illustrating a drive control program executed by the microcomputer shown in FIG. 1.

Besides the execution of the main program, the microcomputer 30 executes the drive control program of FIG. 11. After the drive control program is started in step 700, the microcomputer 30 determines in step 702 whether any of the fail flag FAIL and the first and second stop flags STP1, STP2, described below, is "1". Since all the flags FAIL, STP1, STP2 are "0" in this case, the microcomputer 30 makes a negative determination in step 702, and proceeds to the process of steps 704–724, wherein the electric motor 21 and the leveling valves 25, 26 are controlled in accordance with the set state of a front raising flag FU, a front lowering flag FD, a rear raising flag RU and a rear lowering flag RD. These flags indicate performance of the raising and lowering controls of the front and rear portions of the vehicle body 10, respectively. In this case, since all the flags FU, FD, RU, RD are kept at "0" by the initial setting, the microcomputer 30 stops the electric motor 21 by the process of steps 704, 706, and sets the leveling valve 25 to the non-energized state by the process of steps 714, 716, and sets the leveling valve 26 to the non-energized state by the process of steps 720,722. As a result, the hydraulic pressure in the hydraulic cylinders 11*a*, 11*b* is maintained, and the hydraulic pressure in the hydraulic cylinders 11*c*, 11*d* is maintained, so that the vehicle heights of the front and rear portions of the vehicle body 10 are maintained at levels where they have been. After step 706, a motor operation flag POP is set to "0" in step 708. The motor operation flag POP indicates by "1" that the electric motor 21 is being operated.

In the main program of FIG. 2, after the front start determining routine of step 116 and the rear start determining routine of step 118, the front end determining routine of step 120 and the rear end determining routine of step 122 are executed. The front end determining routine is illustrated in detail in FIG. 5. After the front end determining routine is started in step 300, the microcomputer 30 determines in step 302 whether the front raising flag FU is "1". If not, it is determined in step 304 whether the front lowering flag FD is "1". Since the front raising flag FU and the front lowering flag FD have been set to "0" in this case, the microcomputer 30 makes a negative determination in steps 302, 304, and immediately ends the execution of the front end determining routine in step 314. The rear end determining routine is illustrated in detail in FIG. 6. After the routine is started in step 300, the microcomputer 30 determines in step 322 whether the rear raising flag RU is "1". If not, it is determined in step 324 whether the rear lowering flag RD is "1". Since the rear raising flag RU and the rear lowering flag RD have been set to "0" in this case, the microcomputer 30 makes a negative determination in steps 322, 324, and immediately ends the execution of the rear end determining routine in step 334.

Next described will be an operation performed in a case where the actual vehicle heights Hf, Hr of the front and rear portions of the vehicle body 10 are changed due to a change in the number of occupants, a change in the baggage weight, and the like. If the actual vehicle height Hf of the front portion of the vehicle body 10 increases or decreases so that the absolute value $|\Delta Hf|$ of the vehicle height deviation $\Delta Hf$ becomes greater than the threshold Hfth, the microcomputer 30 makes an affirmative determination in step 210 in the start determining routine in FIG. 3. Subsequently in step 212, the microcomputer 30 calculates an accumulated value $\Delta Hfa$ of vehicle height deviations $\Delta Hf$ by performing an arithmetic operation represented by expression 1.

$$\Delta Hfa = \Delta Hfa + \Delta Hf \quad (1)$$

Until the accumulated value $\Delta Hfa$ becomes greater than a predetermined positive value $\Delta H0$ or less than a predetermined negative value $-\Delta H0$, the microcomputer 30 repeatedly makes a negative determination in steps S214, 216. Because the accumulated value $\Delta Hfa$ is initially cleared to zero and because step 212 is executed at predetermined time intervals, the accumulated value $\Delta Hfa$ is substantially equivalent to the integral of the vehicle height deviation $\Delta Hf$ (the amount of shift of the actual vehicle height Hf from the target vehicle height Hf*). If the accumulated value $\Delta Hfa$ becomes greater than the predetermined value $\Delta H0$, the microcomputer 30 makes an affirmative determination in step 214. Then in step 218, it is determined whether the rear lowering flag RD is "0". If the determination in step 218 is affirmative, the microcomputer 30 sets the front raising flag FU to "1" in step 220 to instruct that the front portion of the vehicle body 10 be raised. If the accumulated value $\Delta Hfa$ becomes less than the predetermined value $-\Delta H0$, the microcomputer 30 makes a negative determination in step 214, and makes an affirmative determination in step 216. Subsequently, it is determined in step 222 whether the rear raising flag RU is "0". If the determination in step 222 is affirmative, the microcomputer 30 sets the front lowering flag FD to "1" in step 224 to instruct that the front portion of the vehicle body 10 be lowered. The determining processing of step 218 determines whether the rear lowering flag RD is "0", that is, whether the lowering control of the rear portion of the vehicle body 10 is in a non-operated status. This step is provided in order to prevent simultaneous lowering of the rear portion of the vehicle body 10 and raising of the front portion of the vehicle body 10. The determining processing of step 222 determines whether the rear raising flag RU is "0", that is, whether the raising control of the rear portion of the vehicle body 10 is in a non-operated status. This step is provided in order to prevent simultaneous raising of the rear portion of the vehicle body 10 and lowering of the front portion of the vehicle body 10.

After executing step 220 or 224, the microcomputer 30 clears the accumulated value $\Delta Hfa$ to zero, and sets the front initial flag ILf to "1" in step 226. With the front initial flag ILf set to "1", the microcomputer 30 makes a negative determination in step 204 in the next and later cycles of the front start determining routine. Therefore, the predetermined value Hfth2 is set as a threshold Hfth in step 208.

Figure 4:
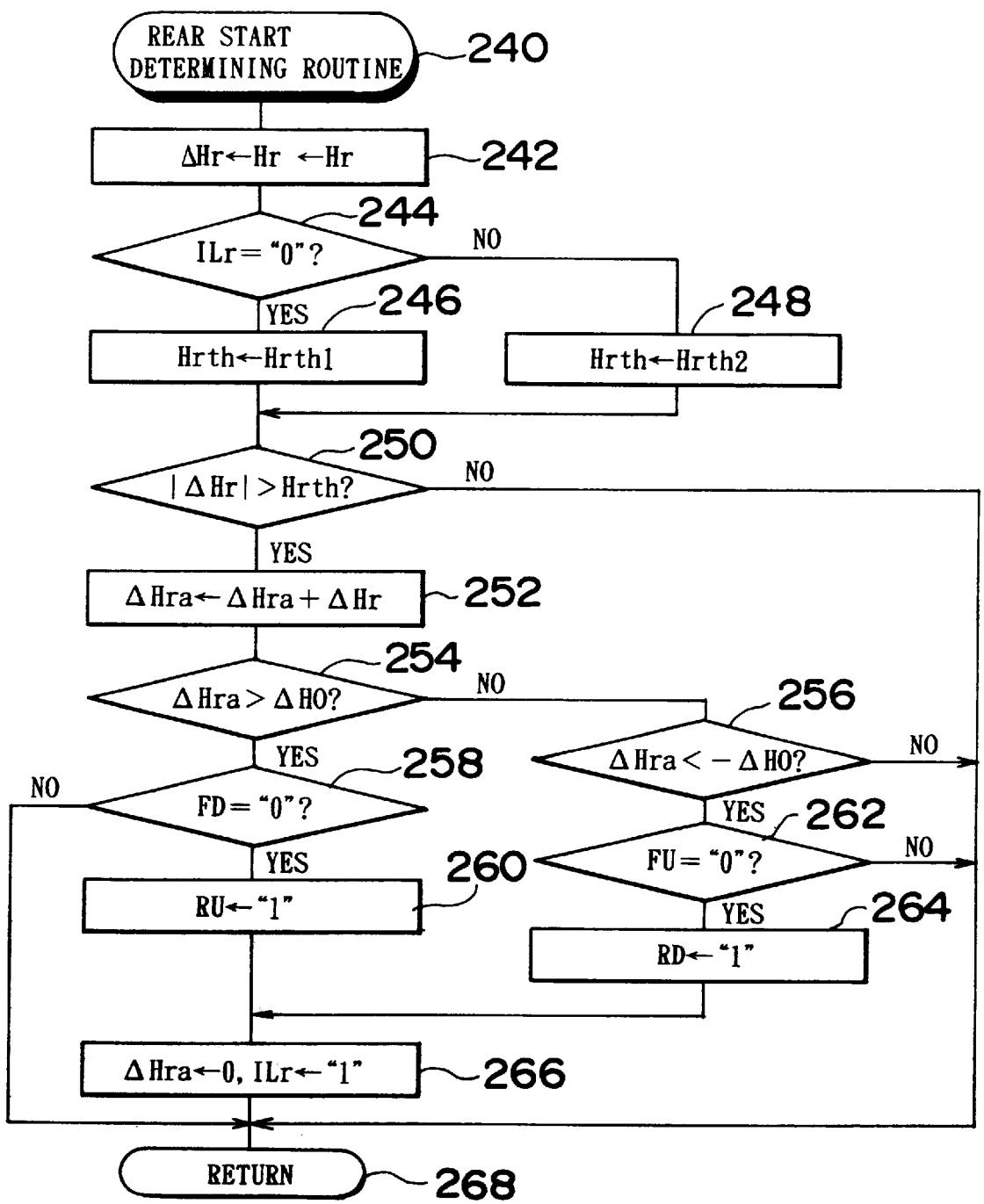
FIG. 4 is a flowchart illustrating in detail the rear start determining routine indicated in FIG. 2.

If the actual vehicle height Hr of the rear portion of the vehicle body 10 is changed so that the absolute value $|\Delta Hr|$ of the vehicle height deviation $\Delta Hr$ of the rear portion becomes greater than the threshold Hrth, the microcomputer 30 makes an affirmative determination in step 250 in the rear start determining routine of FIG. 4, and proceeds to step 252. In step 252, the microcomputer 30 calculates an accumulated value $\Delta Hra$ of vehicle height deviations $\Delta Hr$ by performing an arithmetic operation represented by expression 2.

$$\Delta Hra = \Delta Hra + \Delta Hr \quad (2)$$

Until the accumulated value $\Delta Hra$ becomes greater than the predetermined positive value $\Delta H0$ or less than the predetermined negative value $-\Delta H0$, the microcomputer 30 repeatedly makes a negative determination in steps S254, 256. Because the accumulated value $\Delta Hra$ is initially cleared to zero and because step 252 is executed at predetermined time intervals, the accumulated value $\Delta Hra$ is substantially equivalent to the integral of the vehicle height deviation $\Delta Hr$ (the amount of shift of the actual vehicle height Hr from the target vehicle height Hr*). If the absolute value $|\Delta Hra|$ of the accumulated value $\Delta Hra$ becomes greater than the predetermined value $\Delta H0$, the microcomputer 30 makes an affirmative determination in step 254. Then in step 258, it is determined whether the front lowering flag FD is "0". If the determination in step 258 is affirmative, the microcomputer 30 sets the rear raising flag RU to "1" in step 260 to instruct that the rear portion of the vehicle body 10 be raised. If the accumulated value $\Delta Hra$ becomes less than the predetermined value $-\Delta H0$, the microcomputer 30 makes a negative determination in step 254, and makes an affirmative determination in step 256. Subsequently, it is determined in step 262 whether the front raising flag FU is "0". If the determination in step 262 is affirmative, the microcomputer 30 sets the rear lowering flag RD to "1" in step 264 to instruct that the rear portion of the vehicle body 10 be lowered. The determining processing of step 258 determines whether the front lowering flag FD is "0", that is, whether the lowering control of the front portion of the vehicle body 10 is in a non-operated status. This is provided in order to prevent simultaneous lowering of the front portion of the vehicle body 10 and raising of the rear portion of the vehicle body 10. The determining processing of step 262 determines whether the front raising flag FU is "0", that is, whether the raising control of the front portion of the vehicle body 10 is in a non-operated status. This is provided in order to prevent simultaneous raising of the front portion of the vehicle body 10 and lowering of the rear portion of the vehicle body 10.

After executing step 260 or 264, the microcomputer 30 clears the accumulated value ΔHra to zero, and sets the rear initial flag ILr to "1" in step 266. With the front initial flag ILf set to "1", the microcomputer 30 makes a negative determination in step 244 in the next and later cycles of the rear start determining routine. Therefore, the predetermined value Hrth2 is set as a threshold Hrth in step 248.

If one or two of the front raising flag FU, the front lowering flag FD, the rear raising flag RU and the rear lowering flag RD are set to "1" in this manner, the raising or lowering control of the front portion and/or rear portion of the vehicle body 10 is performed by the process of steps 704–724 in the drive control program of FIG. 11. However, simultaneous setting of one of the front raising flag FU and the rear raising flag RU and one of the front lowering flag FD and the rear lowering flag RD to "1" does not occur.

If both or one of the front raising flag FU and the rear raising flag RU has been set to "1", the electric motor 21 is driven by the process of steps 704, 710 in FIG. 11. Therefore, the hydraulic pump 22 draws hydraulic fluid from the reservoir 23 and ejects it into the fluid passage P5. In response to the ejecting fluid pressure, the discharge valve 27 is switched to the non-conveying state. If the front raising flag FU is "1", the leveling valve 25 is energized by the process of steps 714, 718, so that hydraulic fluid, ejected by the hydraulic pump 22, is supplied to the hydraulic cylinders 11a, 11b through the fluid passages P6, P1, P2. Therefore, the hydraulic cylinders 11a, 11b start to raise the positions of the vehicle body 10 relative to the left and right front wheels W1, W2. If the rear raising flag RU is "1", the leveling valve 26 is energized by the process of steps 720, 724, so that hydraulic fluid, ejected by the hydraulic pump 22, is supplied to the hydraulic cylinders 11c, 11d through the fluid passages P7, P3, P4. Therefore, the hydraulic cylinders 11c, 11d start to raise the positions of the vehicle body 10 relative to the left and right rear wheels W3, W4. When the electric motor 21 is operated as described above, the motor operation flag POP is set to "1" in step 712.

Conversely, if both or one of the front lowering flag FD and the rear lowering flag RD has been set to "1" and, therefore, the front raising flag FU and the rear raising flag RU are maintained at "0", the electric motor 21 is stopped by the process of steps 704, 706. Therefore, the hydraulic pump 22 does not eject hydraulic fluid, so that the discharge valve 27 is maintained in the conveying state. In this case, the motor operation flag POP is set to "0" in step 708. If the front lowering flag FD is "1", the leveling valve 25 is energized by the process of steps 714, 718, so that hydraulic fluid is discharged from the hydraulic cylinders 11a, 11b into the reservoir 23 through the fluid passages P1, P2, P6, P5 and the discharge valve 27. Therefore, the positions of the vehicle body 10 relative to the left and right front wheels W1, W2 start to lower. If the rear lowering flag RD is "1", the leveling valve 26 is energized by the process of steps 720, 724, so that hydraulic fluid is discharged from the hydraulic cylinders 11c, 11d into the reservoir 23 through the fluid passages P3, P4, P7, P5 and the discharge valve 27. Therefore, the positions of the vehicle body 10 relative to the left and right rear wheels W3, W4 start to lower.

Figure 5:
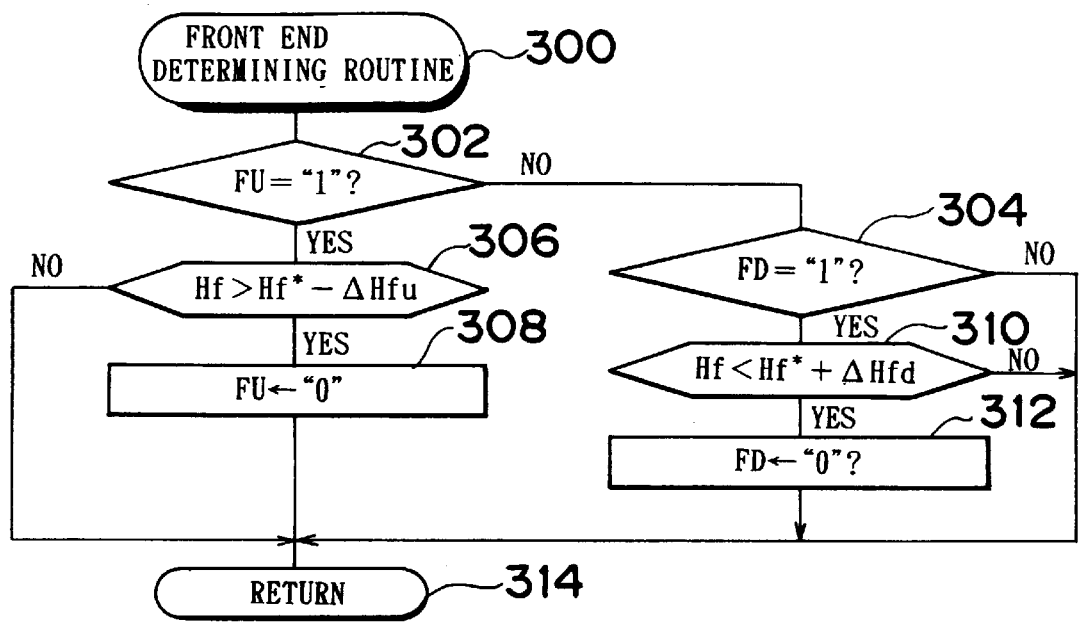
FIG. 5 is a flowchart illustrating in detail the front end determining routine indicated in FIG. 2.

When the front portion of the vehicle body 10 has started to rise or lower with the front raising flag FU or the front lowering flag FD set to "1", the microcomputer 30 makes an affirmative determination in step 302 or 304 in the front end determining routine of FIG. 5. If the front portion of the vehicle body 10 is being raised with the front raising flag FU set to "1", the microcomputer 30 makes an affirmative determination in step 302, and determines in step 306 whether the actual vehicle height Hf of the front portion of the vehicle body 10 is greater than a vehicle height Hf*−ΔHfu, which is a predetermined amount ΔHfu less than the target vehicle height Hf* of the front portion of the vehicle body 10. If the actual vehicle height Hf is not greater than the vehicle height Hf*−ΔHfu, the microcomputer 30 makes a negative determination in step 306, and ends the front end determining routine in step 314. In this case, the front raising flag FU is maintained at "1", so that the raising of the front portion of the vehicle body 10 is continued.

When the front portion of the vehicle body 10 is further raised so that actual vehicle height Hf becomes greater than the vehicle height Hf*−ΔHfu, the microcomputer 30 makes an affirmative determination in step 306, and changes the front raising flag FU to "0" in step 308. Therefore, in the next cycle of the drive control program of FIG. 11, the electric motor 21 is stopped by the process of steps 704, 706, and the energization of the leveling valve 25 is discontinued by the process of steps 714, 716. As a result, the hydraulic pump 22 stops ejecting hydraulic fluid, and the leveling valve 25 is switched to the non-conveying state. Thus, after the raise ending instruction has been outputted by changing the front raising flag FU to "0", the front portion of the vehicle body 10 is stopped subsequently to a small amount of raise. In this case, too, the motor operation flag POP is set to "0" in step 708.

If the front portion of the vehicle body 10 is being lowered with the front lowering flag FD set at "1", the microcomputer 30 makes an affirmative determination in step 304, and determines in step 310 whether the actual vehicle height Hf of the front portion of the vehicle body 10 is less than a vehicle height Hf*+ΔHfd, which is a predetermined amount ΔHfd greater than the target vehicle height Hf* of the front portion of the vehicle body 10. If the actual vehicle height Hf is not less than the vehicle height Hf*+ΔHfd, the microcomputer 30 makes a negative determination in step 310, and ends the front end determining routine in step 314. In this case, the front lowering flag FD is maintained at "1", so that the lowering of the front portion of the vehicle body 10 is continued. When the front portion of the vehicle body 10 is further lowered so that the actual vehicle height Hf becomes less than the vehicle height Hf*+ΔHfd, the microcomputer 30 makes an affirmative determination in step 310, and changes the front lowering flag FD to "0" in step 312. Therefore, in the next cycle of the drive control program of FIG. 11, the energization of the leveling valve 25 is discontinued by the process of steps 714, 716. As a result, the leveling valve 25 is switched to the non-conveying state, so that the discharge of hydraulic fluid from the hydraulic cylinders 11a, 11b stops. Thus, after the lowering ending instruction has been outputted by changing the front lowering flag FD to "0", the front portion of the vehicle body 10 is stopped subsequently to a small amount of descent.

Figure 6:
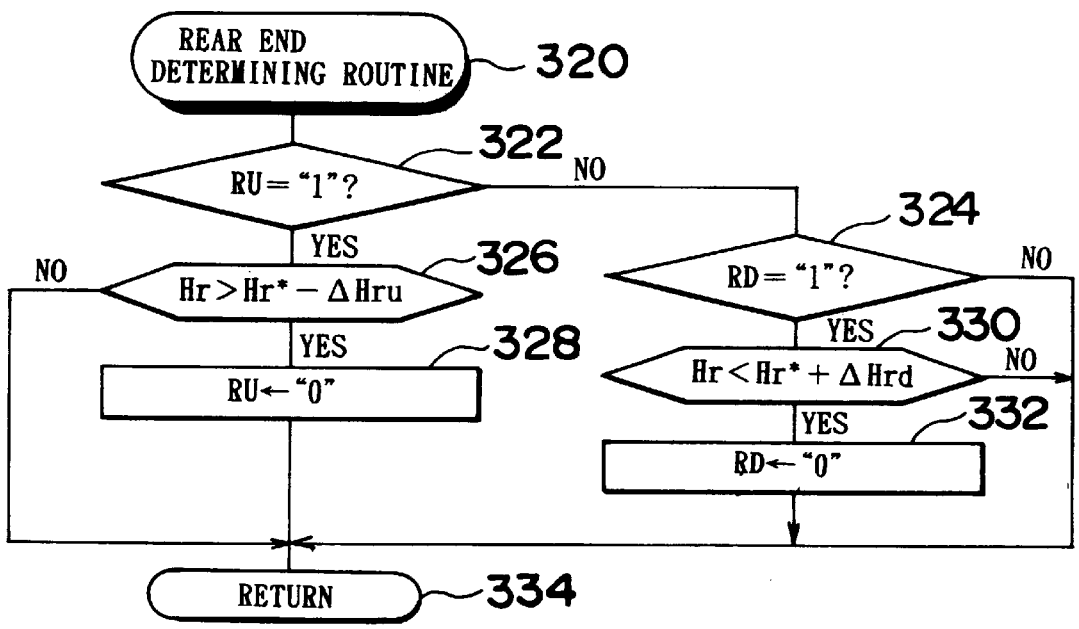
FIG. 6 is a flowchart illustrating in detail the rear end determining routine indicated in FIG. 2.

If the rear portion of the vehicle body 10 has started to rise or lower, the raising or lowering of the rear portion of the vehicle body 10 is stopped by execution of the rear end determining routine of FIG. 6 and the drive control program of FIG. 11, as in the case of the front portion of the vehicle body 10. In the case of the rear portion of the vehicle body 10, the rear raising and lowering flags RU, RD are used instead of the front raising and lowering flags FU, FD in steps 322, 324, 328, 332. In step 326, it is determined whether the actual vehicle height Hr of the rear portion of the vehicle body 10 is greater than a vehicle height Hr*−ΔHru, which is a predetermined amount ΔHru less than the target vehicle height Hr* of the rear portion of the vehicle body 10. In step 330, it is determined whether the actual vehicle height Hr is less than a vehicle height Hr*+ΔHrd, which is a predetermined amount ΔHrd greater than the target vehicle height Hr*. In the drive control program, the raising or lowering of the rear portion of the vehicle body 10 is stopped by the processing of steps 704, 706.

Figure 10:
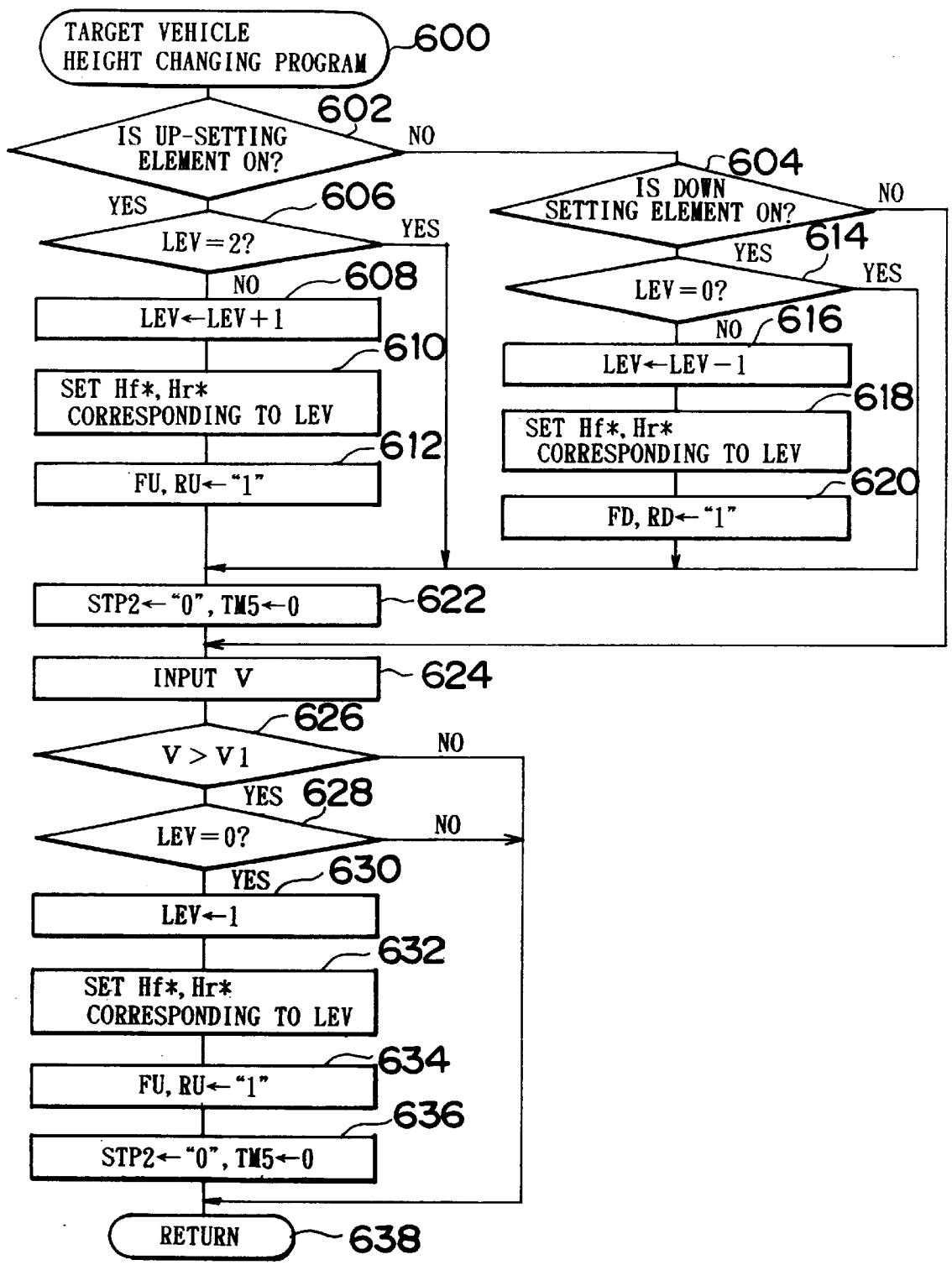
FIG. 10 is a target vehicle height changing program executed by the microcomputer shown in FIG. 1.

The vehicle height control described above is automatically performed if the actual vehicle height Hf or Hr of the front or rear portion of the vehicle body 10 is shifted from the corresponding target vehicle height Hf* or Hr* due to a change, such as from a change in the number of occupants or a change in the baggage weight. Vehicle height adjustment related to the operation of the target vehicle height changing switch 31 will be described. Concurrently with the main program and the drive control program, a target vehicle height changing program illustrated in FIG. 10 is repeatedly executed. After the execution of the target vehicle height changing program is started in step 600, it is determined in step 602 whether the up-setting element 31*a* of the target vehicle height changing switch 31 is operated. If not, it is determined in step 604 whether the down-setting element 31*b* is operated. If neither of these elements are operated, the microcomputer 30 makes a negative determination in steps 602, 604, and jumps, to step 624.

If the up-setting element 31*a* is turned on, the microcomputer 30 makes an affirmative determination in step 602, and then determines in step 606 whether level data LEV is "2". If the level data LEV is not "2", the level data LEV is increased by "1" in step 608. In step 610, the target vehicle heights Hf*, Hr* are set to values corresponding to the increased level data LEV. In step 612, the front raising flag FU and the rear raising flag RU are set to "1". If the level data LEV is "2", the microcomputer 30 makes an affirmative determination in step 606, and jumps to step 622, so that the values of the level data LEV and the target vehicle heights Hf*, Hr* are maintained. The level data LEV indicates low, intermediate and high vehicle heights by the values "0", "1" and "2", respectively. The level data LEV is stored in a non-volatile memory provided in microcomputer 30, together with the target vehicle heights Hf*, Hr*, and retained even after the ignition switch is turned off.

If the down-setting element 31*b* is turned on, the microcomputer 30 makes an affirmative determination in step 604, and determines in step 614 whether the level data LEV is "0". If the level data LEV is not "0", the level data LEV is decreased by "1" in step 616. In step 618, the target vehicle heights Hf*, Hr* are set to values corresponding to the decreased level data LEV. In step 620, the front lowering flag FD and the rear lowering flag RD are set to "1". If the level data LEV is "0", the microcomputer 30 makes an affirmative determination in step 614, and jumps to step 622, so that the values of the level data LEV and the target vehicle heights Hf*, Hr* are maintained. Although in this embodiment, the target vehicle height can be changed among the three levels (low, intermediate and high), it is also possible to reduce the number of levels to two or increase the number of levels to four or more.

After that, the microcomputer 30 clears the second stop flag STP2 to "0", and clears a timer count TM5 to "0" in step 622. The processing of step 622 is related to the second check routine described below.

Subsequently in step 624, the microcomputer 30 receives an input of the detection signal from the vehicle speed sensor 33 indicating the vehicle speed V, and executes the process of steps 626–636. The process of steps 626–636 functions so that if the vehicle height setting is at the low level during stopping of the vehicle and the vehicle is then driven, the vehicle height will be increased to the intermediate level when the vehicle is stopped again. That is, if the vehicle speed V is greater than a predetermined vehicle speed V1 (for example, 5 km/h) and the level data LEV is "0", the microcomputer 30 makes an affirmative determination in steps 626, 628. Subsequently, the microcomputer 30 sets the level data LEV to "1" in step 630, sets the target vehicle heights Hf*, Hr* to the values corresponding to the level data LEV "1" in step 632, and sets the front raising flag FU and the rear raising flag RU to "1" in step 634. Then in step 636, the second stop flag STP2 is cleared to "0", and the timer count TM5 is cleared to "0". If the vehicle speed V is not greater than the predetermined vehicle speed V1 or if the level data LEV is not "0", the microcomputer 30 makes a negative determination in step 626 or 628, and ends the execution of the target vehicle height changing program in step 638, skipping the process of steps 630–636.

If the target vehicle heights Hf*, Hr* are changed in this manner, the front and rear raising flags FU, RU or the front and rear lowering flags FD, RD are set to "1" as described above, so that the front and rear portions of the vehicle body 10 are raised or lowered by execution of the drive control program of FIG. 11. When the actual vehicle height Hf or Hr of the front or rear portion of the vehicle body 10 reaches the vehicle height Hf*−ΔHfu or Hr*−ΔHru during the raising of the front and rear portions of the vehicle body 10, the raising of the front or rear portion of the vehicle body 10 is ended by the front end determining routine of FIG. 5 or the rear end determining routine of FIG. 6, and by the drive control program of FIG. 11. When the actual vehicle height Hf or Hr of the front or rear portion of the vehicle body 10 reaches the vehicle height Hf*+ΔHfd or Hr*+ΔHrd during the lowering of the front or rear portion of the vehicle body 10, the lowering of the front or rear portion of the vehicle body 10 is ended by the front end determining routine of FIG. 5 or the rear end determining routine of FIG. 6, and by the drive control program of FIG. 11.

As can be understood from the foregoing description of the operation of this embodiment, when the ignition switch has just been turned on and the initial flags ILf, ILr are "0", that is, during a period immediately after the engine is started, the absolute values |ΔHf|, |ΔHr| of the vehicle height deviations ΔHf, ΔHr are compared with the predetermined values Hfth1, Hrth1 by the process of steps 204, 206, 210 and the process of steps 244, 246, 250, respectively. If the absolute values |ΔHf|, |ΔHr| are greater than the predetermined values Hfth1, Hrth1, the vehicle height deviations ΔHf, ΔHr are integrated in steps 212, 252, respectively. Depending on the magnitude of the integrals ΔHfa, ΔHra, the initial flags ILf, ILr are set to "1" through the process of steps 214–224 and the process of steps 254–264, respectively. When the initial flags ILf, ILr have thus been set to "1", the process of steps 204, 208, 210 and the process of steps 244, 248, 250 are now executed, so that the integration of the vehicle height deviations ΔHf, ΔHr are performed on the basis of the result of the two processes, respectively. The predetermined values Hfth1, Hrth1 set in steps 206, 246 are smaller than the predetermined values Hfth2, Hrth2 set in steps 208; 248. Therefore, during an initial period immediately after the start of the engine, the integrating operations of steps 212, 252 are performed if the amounts of shift of the actual vehicle heights Hf, Hr from the target vehicle heights Hf*, Hr* (the vehicle height deviations ΔHf=Hf*−Hf, ΔHr=Hr*−Hr) are greater than the relatively small thresholds Hfth1, Hrth1. After the initial period, the integrating operations are not performed unless the amounts of shift are greater than the relatively great thresholds Hfth2, Hrth2. Therefore, during the initial period immediately after the start of the engine, it is determined that a vehicle height adjustment operation should be started merely if the actual vehicle height Hf or Hr shifts from the target vehicle height Hf* or Hr* at least to a reduced extent. During a later period, it is determined that a vehicle height adjustment operation should be started if the actual vehicle height Hf or Hr shifts from the target vehicle height Hf* or Hr* at least to an increased extent. In other words, the sensitivity to vehicle height shift in determining whether to start vehicle height adjustment is enhanced during the initial period immediately after the start of the engine, and the sensitivity is reduced after the initial period. Therefore, this embodiment prevents unnecessary vehicle height adjustment in response to a temporary vehicle height change in a normal occasion, but performs vehicle height adjustment at an earlier timing during the initial period immediately after the start of the engine, during which there is a high likelihood that a vehicle height change occurred during the stop of the vehicle. Consequently, the vehicle height adjustment will be precisely performed when it is necessary.

As for the vehicle height adjustment ending operations, the vehicle height increasing control is ended when the actual vehicle heights Hf, Hr become greater than the vehicle heights Hf*−ΔHfu, Hr*−ΔHru, through the process of steps 302, 306, 308 in the front end determining routine of FIG. 5 and the process of steps 322, 326, 328 in the rear end determining routine of FIG. 6, respectively. The vehicle height reducing control is ended when the actual vehicle heights Hf, Hr become less than the vehicle heights Hf*+ΔHfd, Hr*+ΔHrd, through the process of steps 304, 310, 312 in the front end determining routine of FIG. 5 and the process of steps 324, 330, 332 in the rear end determining routine of FIG. 6, respectively. The predetermined values ΔHfu, ΔHru are preset to values that are smaller than the predetermined values ΔHfd, ΔHrd. Therefore, when the operation of the actuators, such as the electric motor 21, the hydraulic pump 22, the hydraulic cylinders 11a–11d and the like, is stopped to end the vehicle height adjustment, the actual vehicle heights Hf, Hr are farther apart from the respective target vehicle heights Hf*, Hr* in a case where the vehicle height has been reduced than in a case where the vehicle height has been increased. This feature of the embodiment is advantageous in effectively minimizing the overshoot in the vehicle height increasing and reducing control operations since the vehicle height changing rate during the vehicle body lowering control operation is greater than the vehicle height changing rate during the vehicle body raising control operation due to the weight of the vehicle body 10. Therefore, this embodiment is able to precisely perform vehicle height adjustment.

Operations at Time of Abnormality

Next described will be the first check routine of step 124 and the second check routine of step 126 in the main program in FIG. 2. The first and second check routines are executed during the vehicle height adjusting control operation as described above, in order to check for a vehicle height adjustment-impossible state due to an abnormality of the electric motor 21, the hydraulic pump 22, the pressure sensor 34 or the like, oil exhaustion, an excessive load superimposed on the vehicle, a failure of the apparatus, or the like.

Figure 7:
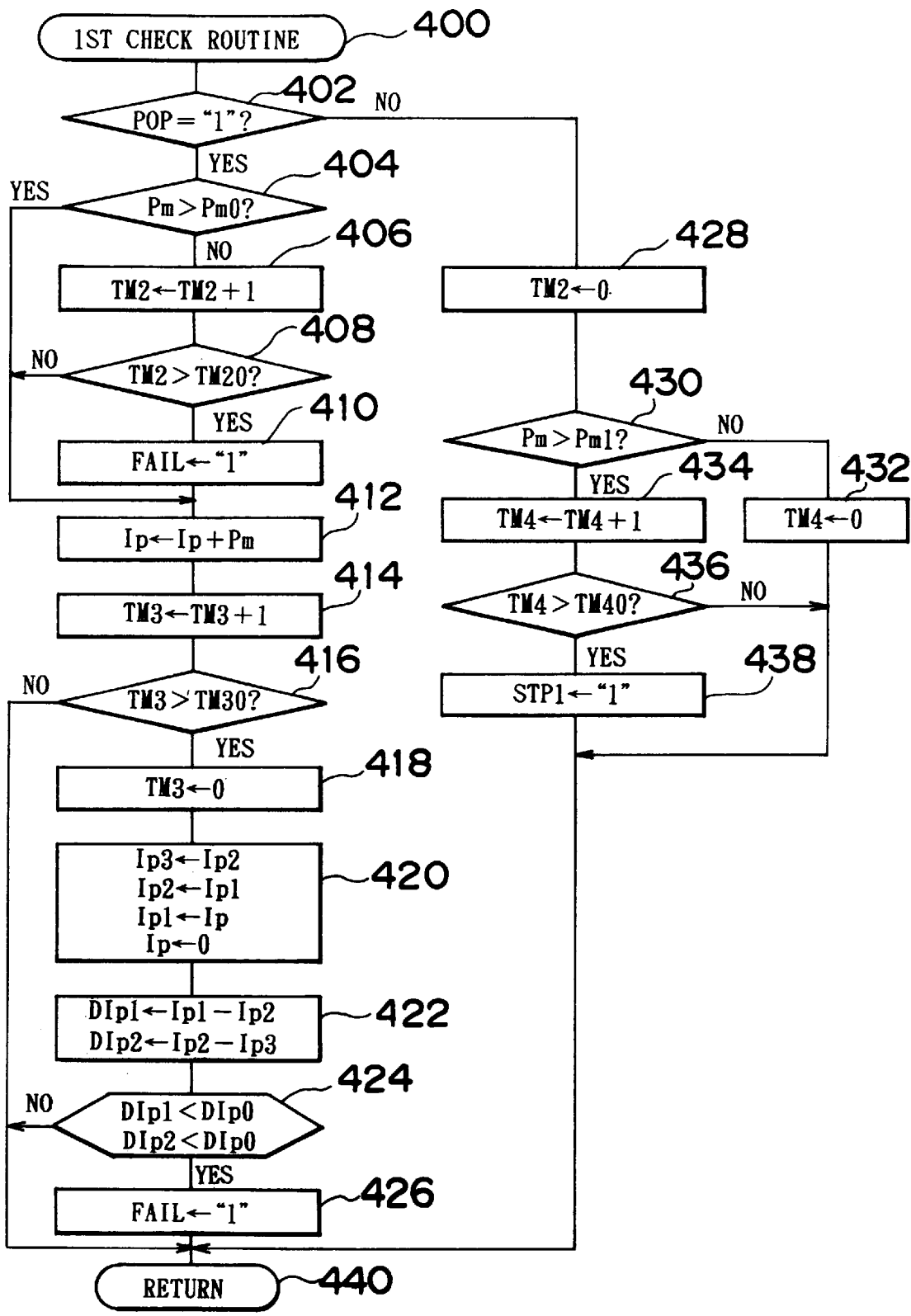
FIG. 7 is a flowchart illustrating in detail the first check routine indicated in FIG. 2.
Figure 8:
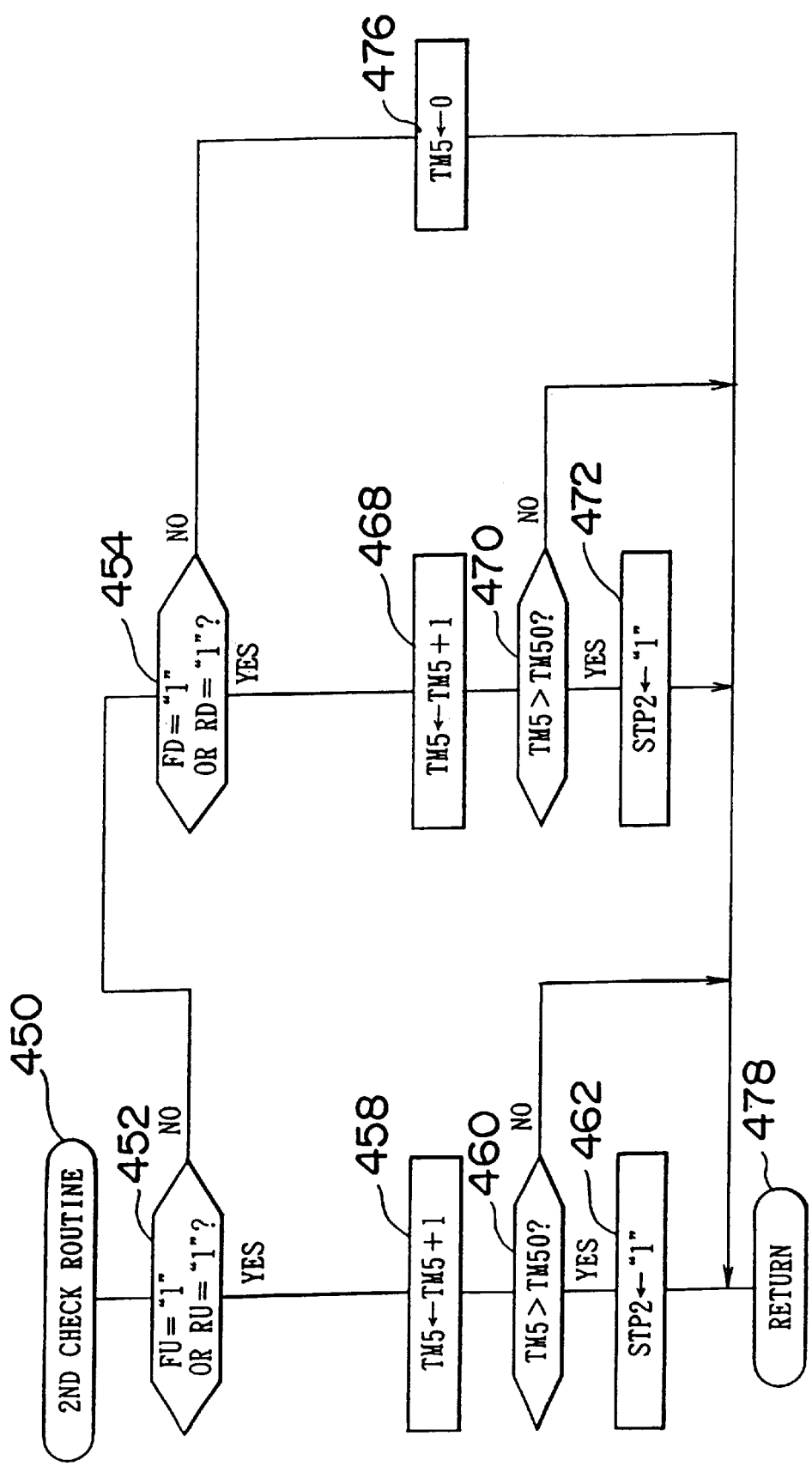
FIG. 8 is a flowchart illustrating in detail the second check routine indicated in FIG. 2.

The first check routine is illustrated in detail in FIG. 7. After the routine is started in step 400, the microcomputer 30 determines in step 402 whether the motor operation flag POP is "1". The value "1" in motor operation flag POP indicates that the electric motor 21 and the hydraulic pump 22 are being operated, and the value "0" indicates that the electric motor 21 and the hydraulic pump 22 are not being operated. The motor operation flag POP is set to "0" or "1" in step 708 or 712 in the drive control program of FIG. 11, as described above.

If the electric motor 21 and the hydraulic pump 22 are in operation and the motor operation flag POP is "1", the microcomputer 30 makes an affirmative determination in step 402, and executes the process of steps 404–410 for determining whether the hydraulic pump 22 is ejecting hydraulic fluid normally. In step 404, it is determined whether the ejecting pressure Pm of the hydraulic pump 22 detected by the pressure sensor 34 is greater than a predetermined fluid pressure Pm. If it is not greater than the predetermined fluid pressure Pm, the microcomputer 30 makes a negative determination in step 404, and increases a timer count TM2 that indicates the time elapsing from the start of the operation of the electric motor 21 by 1 in step 406. In step 408, it is determined whether the timer count TM2 is greater than a predetermined value TM20. If it is greater than the predetermined value TM20, the microcomputer 30 makes an affirmative determination in step 408, and sets the fail flag FAIL to "1" in step 410. That is, if the ejecting pressure Pm of the hydraulic pump 22 does not become greater than the predetermined fluid pressure Pm0 (corresponding to a minimum ejecting pressure of the hydraulic pump 22) before the timer count TM2 exceeds the predetermined value TM20, it is determined that there is an abnormality in the hydraulic pump 22. The fail flag FAIL is set to "1" to indicate the abnormality of the hydraulic pump 22 in step 410. The timer count TM2 is cleared to "0" by the processing of step 428 while the electric motor 21 is stopped.

Subsequently, the microcomputer 30 executes the process of steps 412–426 for determining whether there is an abnormality in the hydraulic system due to hydraulic fluid exhaustion or the like. By the process of steps 412–420, the ejecting pressure Pm of the hydraulic pump 22 is accumulated (integrated) over a predetermined time TM30, and the last three integrals Ip are updated at every lapse of a predetermined time period TM30, as integrals Ip1, Ip2, Ip3 in order of time with Ip1 being the latest. Subsequently in step 422, the microcomputer 30 calculates increments DIp1=Ip1−Ip2, DIp2=Ips−Ip3 from the integrals Ip2, Ip3 to the integrals Ip1, Ip2. If it is determined in step 424 that both the increments DIp1, DIp2 are less than a relatively small predetermined value DIp0, the microcomputer 30 determines that there is an abnormality in the hydraulic system, and then sets the fail flag FAIL to "1" in step 426 to indicate the abnormality. This determining procedure is based on the understanding that if the hydraulic system is normally filled with hydraulic fluid and the hydraulic pump 22 is normally ejecting hydraulic fluid, the hydraulic pressure downstream of the hydraulic pump 22 increases as time elapses. The determining condition that the two increments DIp1, DIp2 are less than the predetermined value DIp0 is employed in order to ensure the precision of abnormality detection.

Through the processes of steps 402–410 and steps 412–426, the microcomputer 30 detects an abnormality in the hydraulic system based on conditions that the ejecting pressure Pm of the hydraulic pump 22 does not reach the predetermined fluid pressure Pm0 within a predetermined length of time following the starting control of the electric motor 21, and that the hydraulic pressure downstream of the hydraulic pump 22 does not significantly increase during the operation of the electric motor 21. Thus, an abnormality in the hydraulic system can easily be detected.

The fail flag FAIL, provided for indicating an abnormality in the hydraulic system, indicates a serious abnormality in the hydraulic system. Therefore, the fail flag FAIL is stored in the non-volatile memory provided in the microcomputer 30, and will not be changed even if the ignition switch is turned off. If the fail flag FAIL has been set to "1", the microcomputer 30 makes an affirmative determination in step 102 in the main program of FIG. 2, and executes the process of steps 128–132. In step 128, it is determined whether a pump check end flag PCF is "1". The pump check end flag PCF is used to check whether recovery from an abnormality has been performed just once since the turning-on of the ignition switch while the fail flag FAIL is "1". The pump check end flag PCF is set to "0" by the initial setting operation immediately after the ignition switch is turned on. Therefore, immediately after the ignition switch is turned on to start the engine, the microcomputer 30 makes a negative determination in step 128, and receives an input of the ejecting pressure Pm of the hydraulic pump 22 from the pressure sensor 34 in step 130, and executes the fail recovery check routine in step 132.

Figure 9:
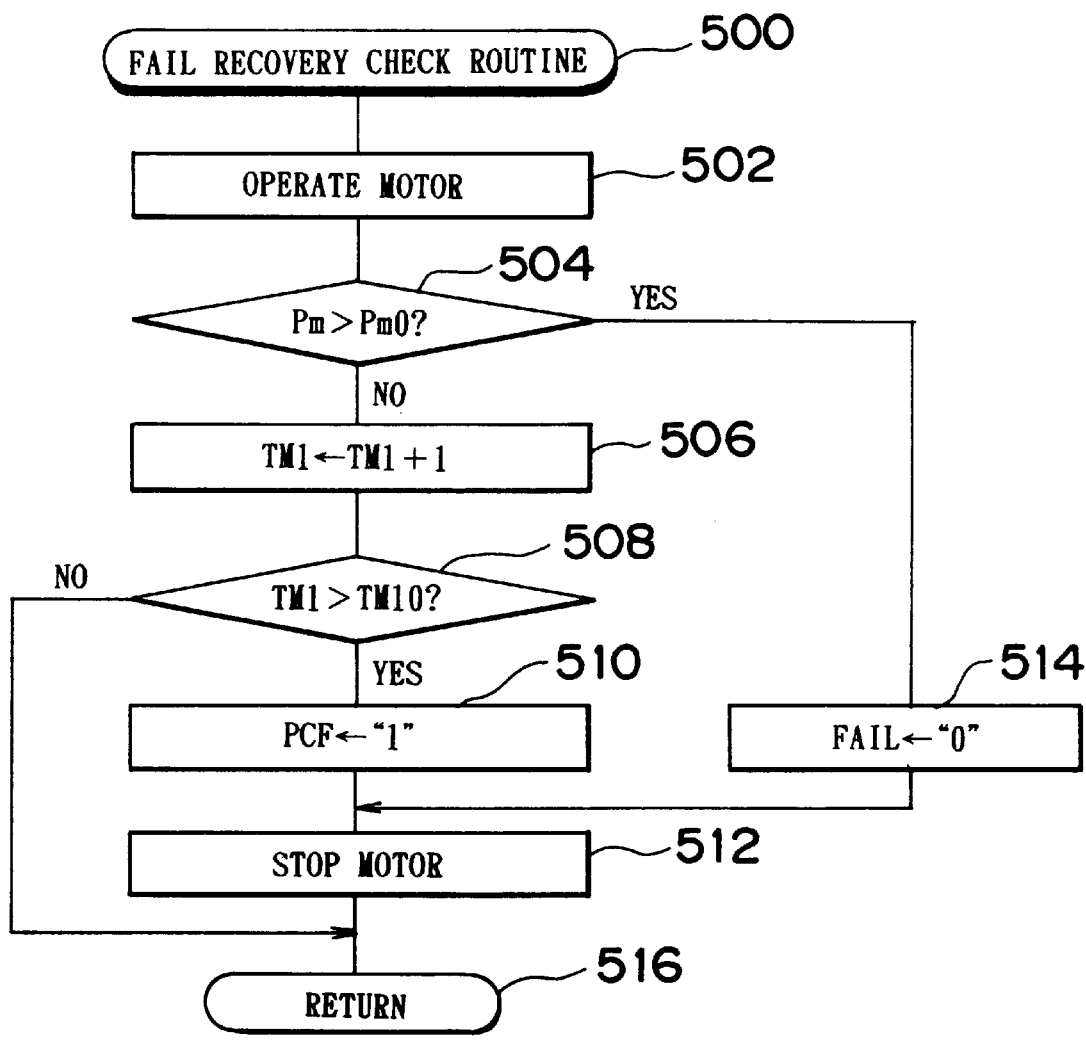
FIG. 9 is a flowchart illustrating in detail the fail recovery check routine indicated in FIG. 2.

The fail recovery check routine is illustrated in detail in FIG. 9. After the routine is started in step 500, the microcomputer 30 operates the electric motor 21 in step 502. In this case, the leveling valves 25, 26 are maintained at the non-conveying state. In step 506, the microcomputer 30 increases a timer count TM1 by 1, which has been cleared to "0" by the initial setting operation and which is measuring the time elapsing after the turning-on of the ignition switch. Until the timer count TM1 exceeds a predetermined value TM10, the microcomputer 30 continually determines in step 504 whether the ejecting pressure Pm of the hydraulic pump 22 has become greater than the predetermined fluid pressure Pm0. If the ejecting pressure Pm becomes greater than the predetermined fluid pressure Pm0, the microcomputer 30 makes an affirmative determination in step 504, sets the fail flag FAIL back to "1" in step 514, stops the hydraulic pump 22 in step 512, and ends the execution of the fail recovery check routine in step 516. If the fail flag FAIL has been set back to "0" in this manner, the vehicle height adjust control is restarted on the condition that the first and second stop flags STP1, STP2 are "0".

If the ejecting pressure of the hydraulic pump 22 does not become greater than the predetermined fluid pressure before the timer count TM1 exceeds the predetermined value TM10, the microcomputer 30 makes an affirmative determination in step 508, and sets the pump check end flag PCF to "1" in step 510, stops the hydraulic pump 22 in step 512, and ends the execution of the fail recovery check routine in step 516. In this case, the microcomputer 30 makes an affirmative determination in step 128 in FIG. 2, and jumps to step 134. Therefore, the fail recovery check routine will not be executed until the next time the ignition switch is turned on to start the engine. Since the fail recovery check routine causes an operation wherein the hydraulic pump 22 ejects hydraulic fluid while the leveling valves 25, 26 are closed, frequent performance of this operation is not favorable in view of the durability of the electric motor 21, the hydraulic pump 22 and the like.

If the fail flag FAIL has been set to "1" when the drive control program of FIG. 11 is executed, the microcomputer 30 makes an affirmative determination in step 702, and executes the process of steps 726–734. If the pump check end flag PCF is "0", the microcomputer 30 makes affirmative determination in step 702, so that the operation of the electric motor 21 is allowed. Subsequently, the execution of the drive control program is ended in step 736. Conversely, if the pump check end flag PCF has been set to "1", the microcomputer 30 makes negative determination in step 726. In steps 728, 732, 734, the microcomputer 30 stops the operation of the electric motor 21, and maintains the leveling valves 25, 26 in the non-conveying state, thereby maintaining the vehicle height adjustment in a stopped status. In this case, the motor operation flag POP is set to "0" in step 730.

Next described will be an operation executed in a case where the microcomputer 30 has made a negative determination in step 402 in the first check routine of FIG. 7, that is, where the electric motor 21 and the hydraulic pump 22 are not in operation. In this case, after executing step 428, the microcomputer 30 executes the process of steps 430–438 for determining whether the pressure sensor 34 is normal. By the processing of step 430, it is determined whether a state is present where the fluid pressure Pm detected by the pressure sensor 34 is greater than predetermined fluid pressure Pm1, although the electric motor 21 and the hydraulic pump 22 are stopped. As long as the aforementioned state is detected in step 430, the microcomputer 30 increases a timer count TM4 by 1 in step 434. When it is determined in step 436 that the timer count TM4 has become greater than a predetermined value TM40, that is, when it is determined that there is an abnormality in the pressure sensor 34, the microcomputer 30 sets the first stop flag STP1 to "1" in step 438 to indicate the abnormality. The timer count TM4 is cleared to "0" in step 432 if the detected fluid pressure Pm becomes equal to or lower than the predetermined fluid pressure Pm1 during the stop of the electric motor 21.

If an abnormality of the pressure sensor 34 is detected and the first stop flag STP1 is set to "1", the microcomputer 30 makes an affirmative determination in step 104 in the main program of FIG. 2, and immediately ends the execution of the main program in step 134. In the drive control program of FIG. 11, the microcomputer 30 makes an affirmative determination in steps 702, and makes a negative determination in step 726. Then, the process of steps 728–734 is executed, thereby maintaining the vehicle height adjustment in the stopped state. The first stop flag STP1 is stored in a normal RAM provided in the microcomputer 30. The first stop flag STP1 is initialized to "0" when the ignition switch is turned on to start the engine. Therefore, the process of steps 430–438 for determining whether there is an abnormality in the pressure sensor 34 is executed every time the ignition switch is turned on.

Next described will be the second check routine of step 126 in the main program of FIG. 2. The second check routine is illustrated in detail in FIG. 8. After the routine is started in step 450, the microcomputer 30 determines in step 452 whether the front raising flag FU or the rear raising flag RU is "1". If the determination in step 452 is negative, the microcomputer 30 determines in step 454 whether the front-lowering flag FD or the rear lowering flag RD is "1". If all the flags FU, FD, RU, RD are "1", the microcomputer 30 makes a negative determination in steps 452, 454, and clears the timer count TM5 to 0 in step 476, and then ends the execution of the second check routine in step 478.

Conversely, if the front raising flag FU or the rear raising flag RU is "1", the microcomputer 30 makes an affirmative determination in step 452. While at least one of the front raising flag FU and the rear raising flag RU is "1", the microcomputer 30 increases the timer count TM5 by 1 in step 458. When the timer count TM5 becomes greater than a predetermined value TM50, the microcomputer 30 makes an affirmative determination in step 460, that is, determines that there is an abnormality in the vehicle height increasing control. Subsequently in step 462, the microcomputer 30 sets the second stop flag STP2 to "1" to indicate the abnormality. Through this operation, therefore, the second stop flag STP2 is set to "1" in a case where the load superimposed on the vehicle is very large, or in a case where due to an abnormality in the hydraulic system, the electric system or the like, the vehicle height increasing control does not end before an appropriate length of time elapses.

If the front lowering flag FD or the rear lowering flag RD is "1", the microcomputer 30 makes an affirmative determination in step 454. While at least one of the front lowering flag FD and the rear lowering flag RD is "1", the microcomputer 30 increases the timer count TM5 by 1 in step 468. When the timer count TM5 becomes greater than the predetermined value TM50, the microcomputer 30 makes an affirmative determination in step 470, that is, determines that there is an abnormality in the vehicle height decreasing control. Subsequently in step 472, the microcomputer 30 sets the second stop flag STP2 to "1" to indicate the abnormality. Through this operation, therefore, the second stop flag STP2 is set to "1" in a case where due to an abnormality in the hydraulic system, the electric system or the like, the vehicle height decreasing control does not end before an appropriate length of time elapses.

If the second stop flag STP2 has been set to "1", the microcomputer 30 makes an affirmative determination in step 104 in the main program of FIG. 2, and immediately ends the execution of the main program in step 134. In the drive control program of FIG. 11, the microcomputer 30 makes an affirmative determination in step 702, and makes a negative determination in step 726. Then, the process of steps 728–734 is executed, thereby maintaining the stopped state of the vehicle height adjustment. The second stop flag STP2 is stored in a normal RAM provided in the microcomputer 30. The second stop flag STP2 is initialized to "0" when the ignition switch is turned on to start the engine. In addition, if the target vehicle heights Hf*, Hr* are changed by operating the target vehicle height changing switch 31 or in response to a change in the vehicle speed V, the second stop flag STP2 is set back to "0" and, at the same time, the timer count TM is cleared to "0" in steps 622, 636 in the target vehicle height changing program of FIG. 10.

Therefore, if the actual vehicle heights cannot be adjusted to the target vehicle heights Hf*, Hr* by the raising or lowering control of the vehicle body 10 within an appropriate length of time, the vehicle height adjust control is suspended. If the suspension of the vehicle height adjustment is discontinued and, therefore, the vehicle height adjustment is restarted in response to a change in the target vehicle heights Hf*, Hr* or the turning-on of the ignition switch, such an abnormality in vehicle height setting will be detected again.

Figure 12:
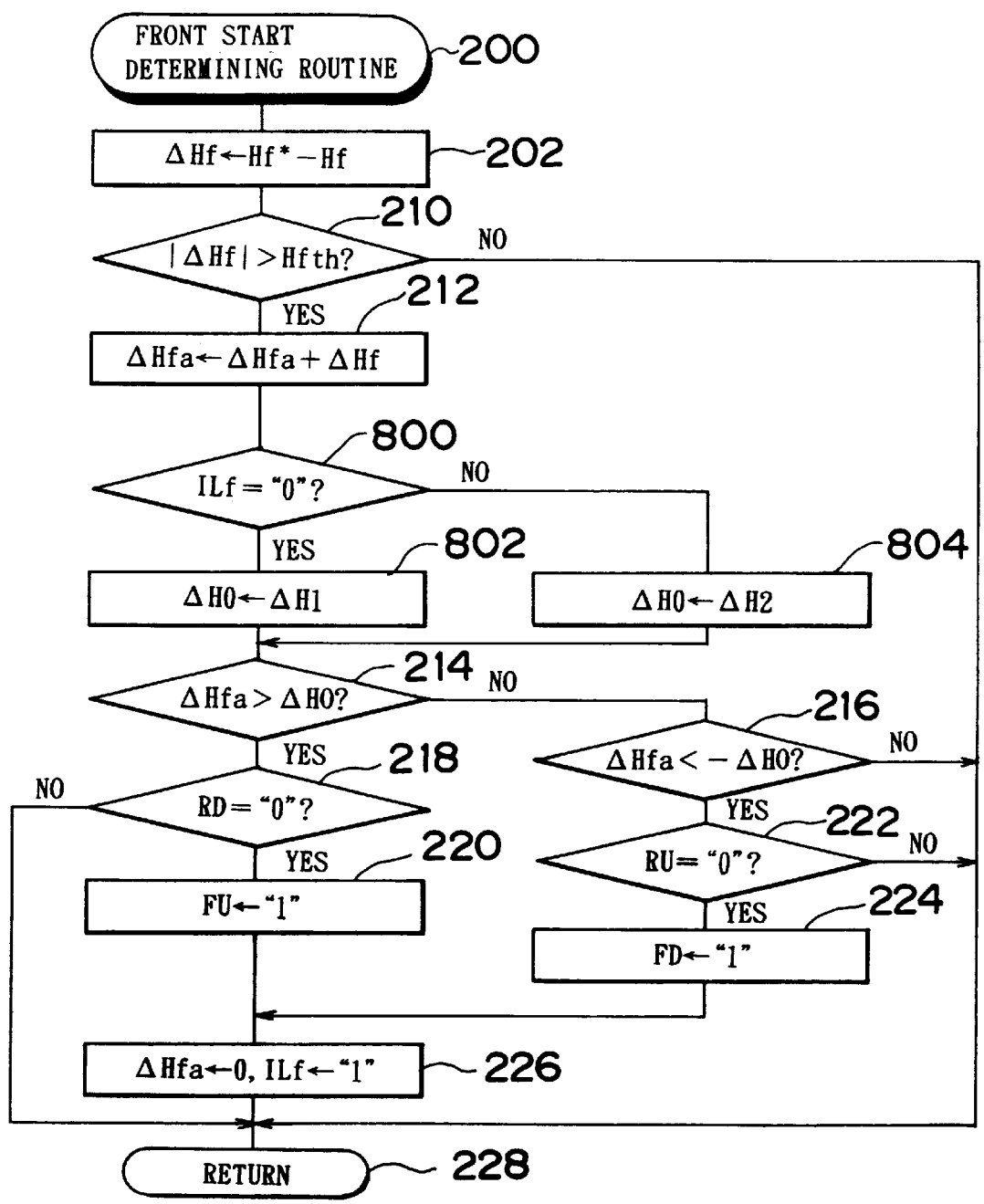
FIG. 12 is a flowchart illustrating a first modified front start determining routine according to the invention.

Consequently, this embodiment is able to detect various abnormalities in the hydraulic system or the electric system or abnormalities due to a very large load superimposed on the vehicle. If such an abnormality is detected, this embodiment performs an appropriate operation in accordance with the abnormality, thereby achieving good vehicle height adjustment First Modification A first modification of the foregoing embodiment will be described. In the first modification, the front start determining routine of FIG. 3 according to the foregoing embodiment is modified as illustrated in FIG. 12. In the start determining routine in FIG. 12, steps 204–208 in FIG. 3 are omitted, and it is determined in step 210 whether the absolute value |ΔHf| of the vehicle height deviation ΔHf is greater than a positive fixed value Hfth that is determined beforehand. Furthermore, steps 800–804 are inserted between steps 212 and 214. In step 800, it is determined whether the front initial flag ILf is "0". The front initial flag ILf is the same as that in the foregoing embodiment. If the front initial flag ILf is "0", the microcomputer 30 makes an affirmative determination in step 800, and sets a comparison value ΔH0 to a predetermined positive value ΔH1 in step 802. Conversely, if the front initial flag ILf is "1", the microcomputer 30 makes a negative determination in step 800, and sets the comparison value ΔH0 to a predetermined positive value ΔH2 in step 804. The predetermined value ΔH1 is set to a value that is smaller than the predetermined value ΔH2.

After step 802 or 804, the microcomputer 30 determines in step 214 whether the integral (accumulated value) ΔHfa obtained through the integration in step 212 is greater than the comparison value ΔH0. If the integral ΔHfa is greater than the comparison value ΔH0, the microcomputer 30 makes an affirmative determination in step 214, and proceeds to step 218. Step 218 and the following steps are substantially the same as those in the foregoing embodiment. If the integral ΔHfa is not greater than the positive comparison value ΔH0, the microcomputer 30 makes a negative determination in step 214, and then determines in step 216 whether the integral ΔHfa is less than the negative comparison value −ΔH0. If the integral ΔHfa is less than the negative comparison value −ΔH0, the microcomputer 30 makes an affirmative determination in step 216, and proceeds to step 222. Step 222 and the following steps are substantially the same as those in the foregoing embodiment.

In the first modification, therefore, during an initial period immediately after the turning-on of the ignition switch, that is, immediately after the start of the engine, the determination for starting vehicle height adjustment is made if the absolute value |ΔHfa| of the integral ΔHfa becomes greater than the comparison value ΔH0 (=ΔH1). After such an initial period, the determination for starting vehicle height adjustment is made if the absolute value |ΔHfa| of the integral ΔHfa becomes greater than the comparison value ΔH0 (=ΔH2), which is greater than the comparison value ΔH0 (=ΔH1) used during the initial period. In this modification, therefore, the sensitivity to vehicle height shift in determining whether to start vehicle height adjustment is enhanced during an initial period immediately after the start of the engine, and the sensitivity is reduced after the initial period. Consequently, vehicle height adjustment will be precisely performed when it is necessary, as in the foregoing embodiment.

Figure 3:
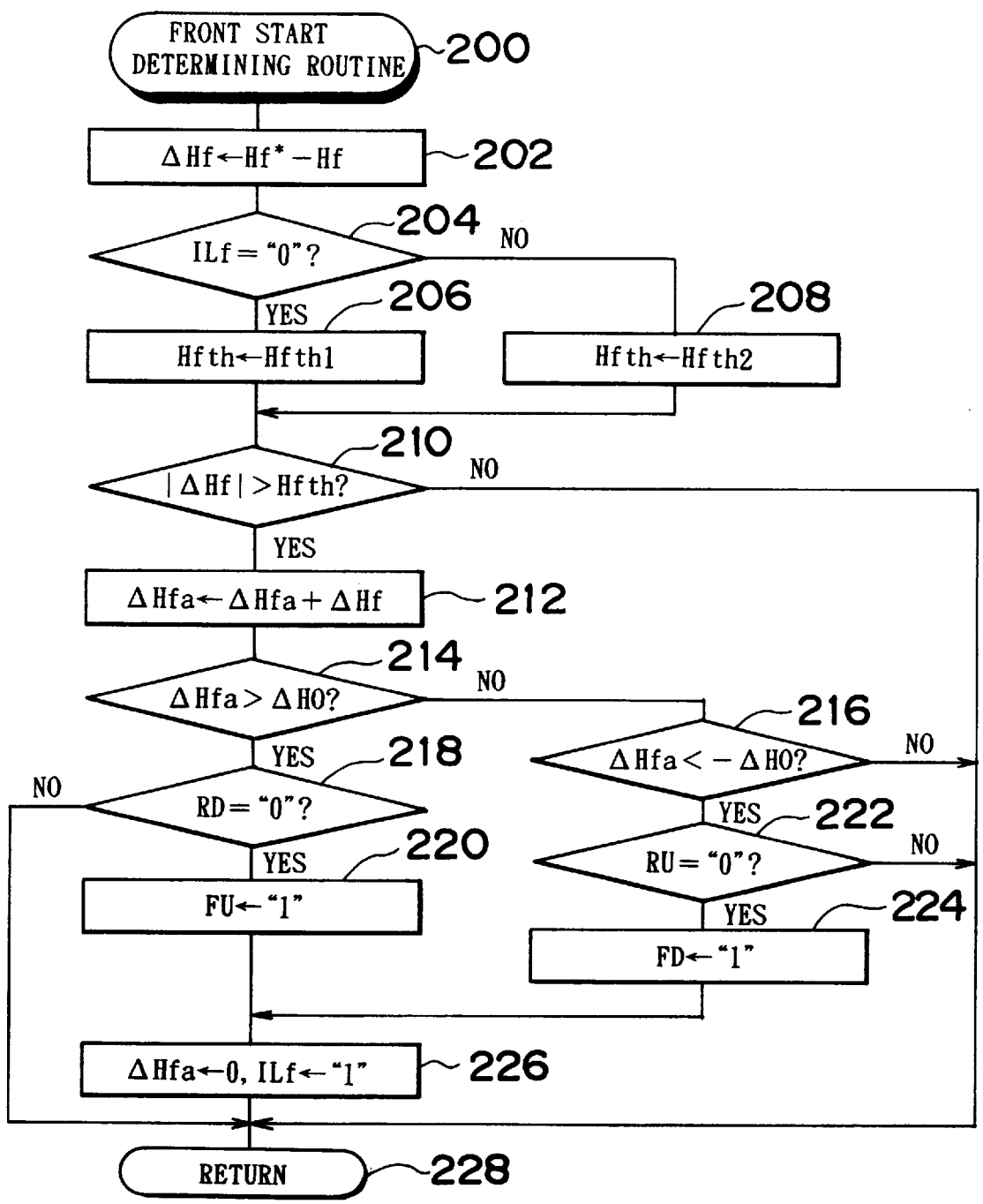
FIG. 3 is a flowchart illustrating in detail the front start determining routine indicated in FIG. 2.

Although in the first modification, the start determining routine of FIG. 3 in the foregoing embodiment is replaced with the start determining routine of FIG. 12, it is also possible to replace the rear start determining routine of FIG. 4 with a rear start determining routine similar to the routine of FIG. 12. Such a modification may be realized, for example, simply by changing the variants or factors in FIG. 12 to the variants and factors regarding the rear portion of the vehicle body 10.

Although in the first embodiment, the accumulation (integration) of the vehicle height deviation ΔHf in step 212 is executed only in a case where it is determined in step 210 that the absolute value |ΔHf| of the vehicle height deviation ΔHf is greater than the threshold Hfth, it is also possible to omit the determining processing of step 210 in order to simplify the program. In such a case, the accumulation (integration) of step 212 is executed immediately after step 202.

Second Modification

Figure 13:
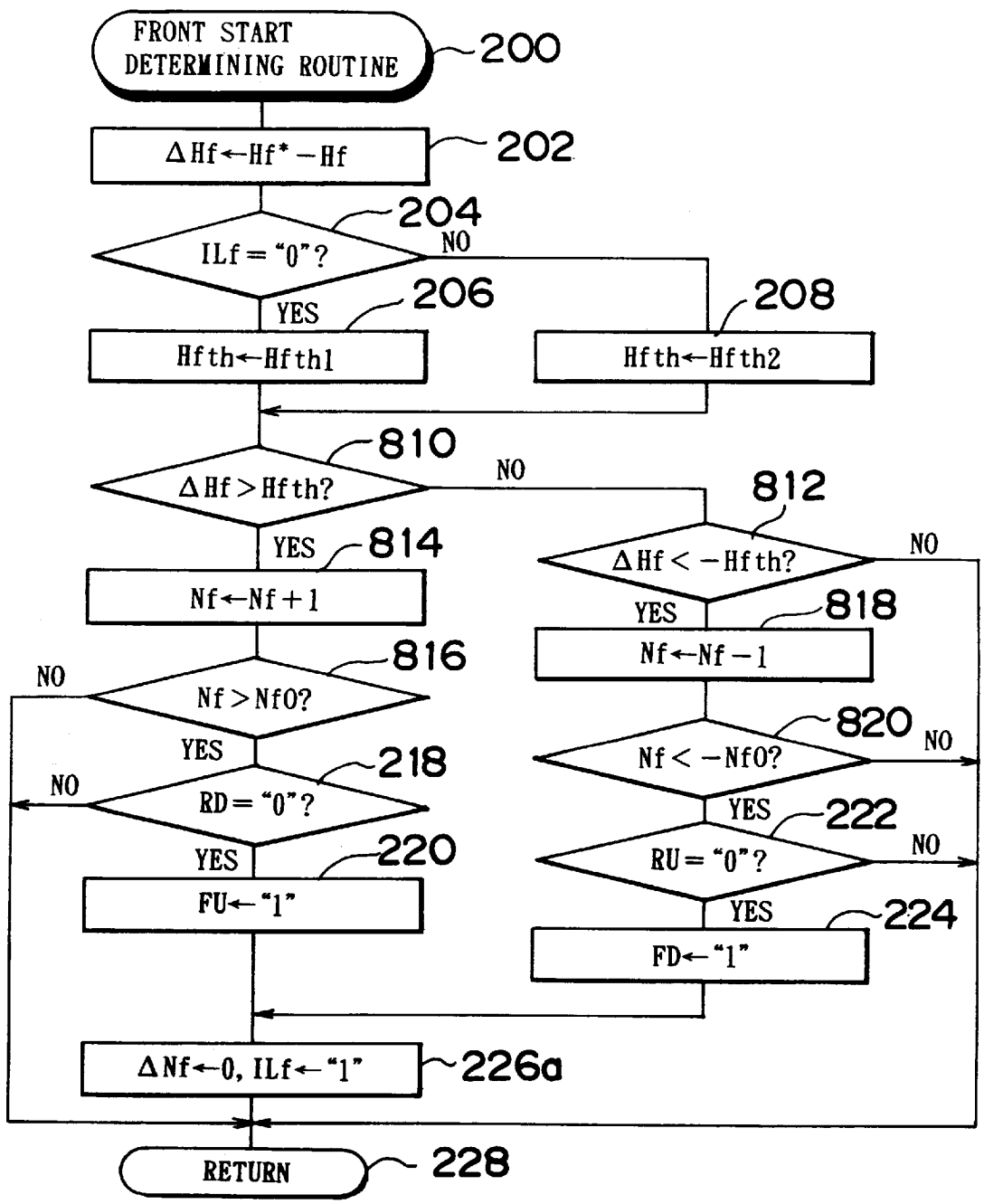
FIG. 13 is a flowchart illustrating a second modified front start determining routine according to the invention.

A second modification of the foregoing embodiment will be described. In the second modification, the front start determining routine of FIG. 3 in the foregoing embodiment is modified, as in the first modification. As illustrated in FIG. 13, steps 210–216 and step 226 in FIG. 3 are replaced with steps 810–820 and step 226a in the second modification. That is, the number of times that the absolute value |ΔHf| of the vehicle height deviation ΔHf of the front portion of the vehicle body 10 exceeds a predetermined positive threshold Hfth is counted. When the counted number exceeds a predetermined number, it is determined that a vehicle height changing control operation should be started.

If the absolute value |ΔHf| of the vehicle height deviation ΔHf is not greater than the threshold Hfth, the microcomputer 30 makes a negative determination in steps 810, 812, and immediately ends the execution of the front start determining routine in step 228. If the vehicle height deviation ΔHf is greater than the threshold Hfth, the microcomputer 30 makes an affirmative determination in step 810, and adds 1 to a count value Nf in step 814. When the count value Nf becomes greater than a positive predetermined value Nf0, the microcomputer 30 makes an affirmative determination in step 816, and executes the process of steps 218, 220 for outputting an instruction to start to raise the front portion of the vehicle body 10 as in the foregoing embodiment. If the vehicle height deviation ΔHf becomes less than the negative predetermine threshold –Hfth, the microcomputer 30 makes an affirmative determination in step 812, and subtracts 1 from the count value Nf in step 818. When the count value Nf becomes less than a predetermined negative value –Nf0, the microcomputer 30 makes an affirmative determination in step 820, and executes the process of steps 222, 224 for outputting an instruction to start to lower the front portion of the vehicle body 10 as in the foregoing embodiment. In step 226a, the count value Nf is cleared to "0", instead of the integral ΔHfa in step 226 in the foregoing embodiment.

The determining process of steps 810–820 in the second modification is, in effect, equivalent to the determining process of steps 210–216 based on integration in the foregoing embodiment. In addition, through the process of steps 204–208, which are substantially the same as that in the foregoing embodiment, the sensitivity to vehicle height shift in determining whether to start vehicle height adjustment is enhanced during an initial period immediately after the start of the engine, and the sensitivity is reduced afterwards. Consequently, the second modification is able to precisely perform vehicle height adjustment when it is necessary, as in the foregoing embodiment.

Although in the second modification, the front start determining routine of FIG. 3 is replaced with the front start determining routine of FIG. 13, it is also possible to replace the rear start determining routine of FIG. 4 with a rear start determining routine similar to the routine of FIG. 13. Such a modification may be realized, for example, simply by changing the variants or factors in FIG. 13 to the variants and factors regarding the rear portion of the vehicle body 10.

Third Modification

Figure 14:
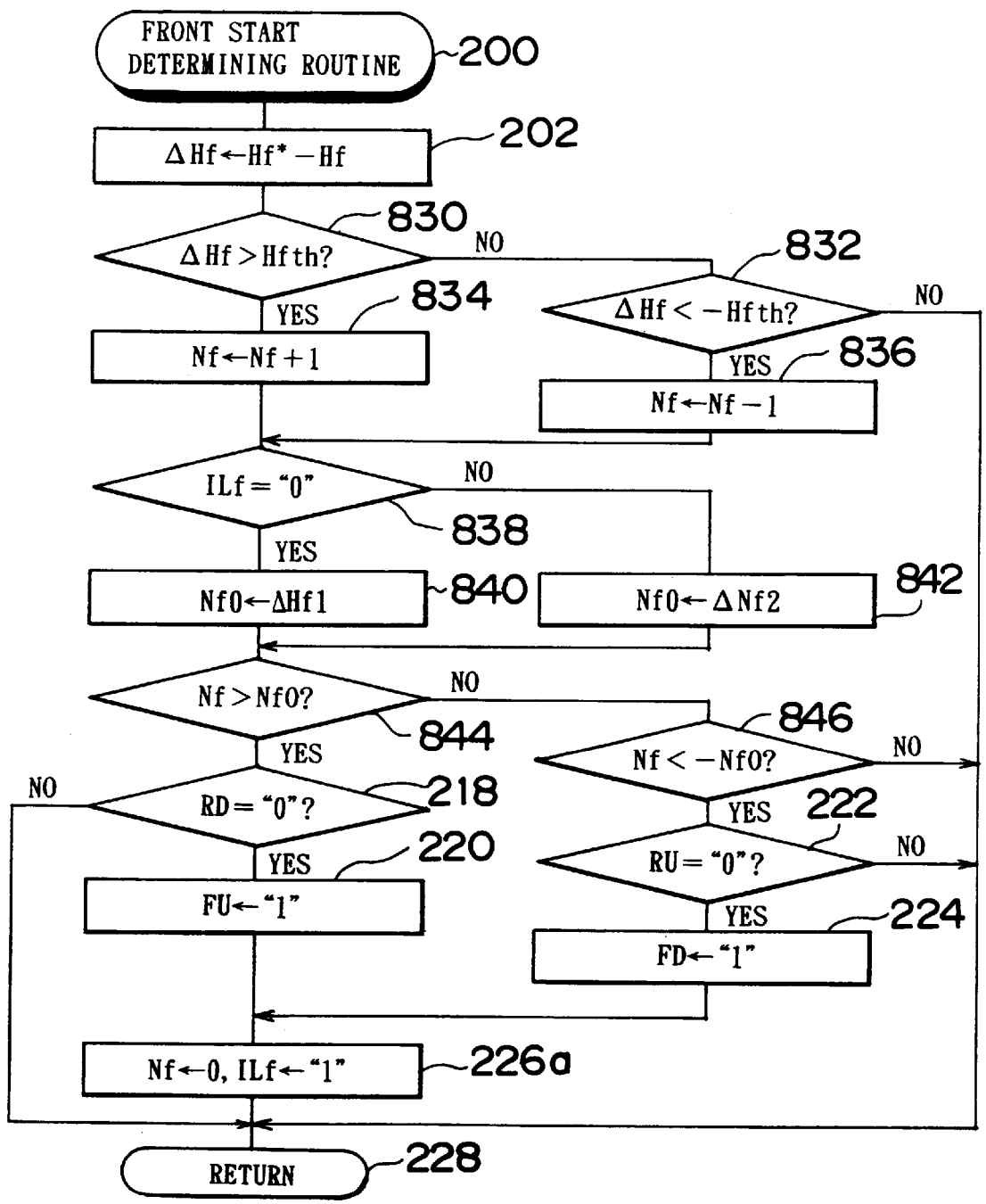
FIG. 14 is a flowchart illustrating a third modified front start determining routine according to the invention.

A third modification of the foregoing embodiment will be described. Similarly to the second modification, the third modification counts the number of times that the absolute value |ΔHf| of the vehicle height deviation ΔHf of the front portion of the vehicle body 10 exceeds a predetermined positive threshold Hfth. When the counted number exceeds a predetermined number, it is determined that a vehicle height changing control operation should be started. As illustrated in FIG. 14, a front start determining routine in the third modification is accomplished by changing a portion of the front start determining routine of FIG. 13.

In the third modification, the process of steps 830–836 is the same as the process of steps 810–814, 818 in the second modification. That is, if the absolute value |ΔHf| of the vehicle height deviation ΔHf is not greater than the positive threshold Hfth, the microcomputer 30 makes a negative determination in steps 830, 832, and immediately ends the execution of the front start determining routine in step 228. If the vehicle height deviation ΔHf becomes greater than the threshold Hfth, the microcomputer 30 makes an affirmative determination in step 830, and adds 1 to the count value Nf in step 834. If the vehicle height deviation ΔHf becomes less than the negative threshold –Hfth, the microcomputer 30 makes an affirmative determination in step 832, and subtracts 1 from the count value Nf in step 836.

Subsequently, by the process of steps 838–842, a comparison value Nf0 is set to a preset positive value Nf1 if the front initial flag ILf is "0", and the comparison value Nf0 is set to a preset positive value Nf2 if the front initial flag ILf is "1". The predetermined value Nf1 is smaller than the predetermined value Nf2. After the comparison value Nf0 is thus set in step 840 or 842, the count value Nf is compared with the comparison value Nf0 in step 844, and with the negative comparison value –Nf0 in step 846 if the count value Nf is not greater than the comparison value Nf0. If the absolute value |Nf| of the count value Nf is less than the absolute value |Nf0| of the comparison value Nf0, the microcomputer 30 makes a negative determination in steps 844 and 846, and then ends the execution of the front start determining routine in step 228. If the count value Nf is greater than the comparison value Nf0, the microcomputer 30 makes an affirmative determination in step 844, and executes the process of steps 218, 220 for outputting an instruction to start to increase the vehicle height as in the foregoing embodiment. If the count value Nf is less than the negative comparison value –Nf0, the microcomputer 30 makes an affirmative determination in step 846, and executes the process of steps 222, 224 for outputting an instruction to start to reduce the vehicle height as in the foregoing embodiment.

In the third modification, therefore, during an initial period immediately after the turning-on of the ignition switch, that is, immediately after the start of the engine, the determination for starting vehicle height adjustment is made if the absolute value |ΔNf| of the count value Nf becomes greater than the comparison value ΔNf0 (=ΔNf1). After such an initial period, the determination for starting vehicle height adjustment is made if the absolute value |ΔNf| of the count value Nf becomes greater than the comparison value ΔNf0 (=ΔNf2), which is greater than the comparison value ΔNf0 (=ΔNf1) used during the initial period. In this modification, therefore, the sensitivity to vehicle height shift in determining whether to start vehicle height adjustment is enhanced during an initial period immediately after the start of the engine, and the sensitivity is reduced afterwards. Consequently, vehicle height adjustment will be precisely performed when it is necessary, as in the foregoing embodiment.

Although in the third modification, the front start determining routine of FIG. 13 in the second modification (corresponding to the routine of FIG. 3 in the foregoing embodiment) is replaced with the front start determining routine of FIG. 14, it is also possible to replace the rear start determining routine of FIG. 4 with a rear start determining routine similar to the routine of FIG. 14. Such a modification may be realized, for example, simply by changing the variants or factors in FIG. 14 to the variants and factors regarding the rear portion of the vehicle body 10.

Other Modifications

Although in the foregoing embodiment and the modifications, two vehicle height sensors are provided in the front portion of the vehicle body 10 and one vehicle height sensor is provided in the rear portion thereof, it is also possible to provide one vehicle height sensor in each of the front and rear portions of the vehicle body 10 and to detect the actual vehicle heights Hf, Hr of the front and rear portions of the vehicle body 10 using the respective sensors. It is also possible to provide one vehicle height sensor at each of the left and right rear wheels W3, W4, and to detect the vehicle height of the rear portion of the vehicle body 10 by averaging the vehicle heights detected by the two sensors. Furthermore, although the foregoing embodiment performs control such that the actual vehicle heights Hf, Hr of the front and rear portions of the vehicle body 10 are set to the respective target vehicle heights Hf*, Hr*, it is also possible to set the vehicle heights of the vehicle body 10 at the individual wheel positions to their respective target vehicle heights.

Although in the foregoing embodiment, the invention is applied to a hydraulic vehicle, height adjust apparatus, the invention may also be applied to vehicle height adjust apparatus employing other types of fluids, for example, a pneumatic vehicle height adjust apparatus using air. In the application to a pneumatic vehicle height adjust apparatus, the hydraulic pump 22 and the hydraulic cylinders 11a–11d are replaced by a pneumatic pump and pneumatic cylinders, and the various valves 25–28 and the like are also replaced by pneumatic valves and the like.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. A vehicle height adjust control apparatus comprising:
   a vehicle engine start detector;
   an actuator that changes a vehicle height;
   a vehicle height detector that detects the vehicle height;
   height adjust start determining means for determining whether to start vehicle height adjustment by comparing the vehicle height detected by the vehicle height detector with a predetermined target vehicle height; and
   vehicle height adjust control means for adjusting the vehicle height by controlling the actuator so that the vehicle height detected by the vehicle height detector becomes substantially equal to the target vehicle height if it is determined by the height adjust start determining means that vehicle height adjustment is to be started,
   wherein during a first period immediately after vehicle engine start is detected by the vehicle engine start detector, the height adjust start determining means uses a first threshold that is smaller than a second threshold used after lapse of the first period, to make a determination regarding start of the vehicle height adjustment.

2. A vehicle height adjust control apparatus according to claim 1, wherein the height adjust start determining means compares an integral of an amount of shift of the vehicle height detected by the vehicle height detector from the target vehicle height, which amount of shift is greater than a first predetermined value, with a second predetermined value, and if the integral of the amount of shift is greater than the second predetermined value, the height adjust start determining means determines that the vehicle height adjustment is to be started, and wherein the first predetermined value used during the first period is smaller than the first predetermined value used after the first period.

3. A vehicle height adjust control apparatus according to claim 1, wherein the height adjust start determining means compares an amount of shift of the vehicle height detected by the vehicle height detector from the target vehicle height with a second predetermined value, and if the integral is greater than the second predetermined value, the height adjust start determining means determines that vehicle height adjustment is to be started, and wherein the second predetermined value used during the first period is smaller than the second predetermined value used after the first period.

4. A vehicle height adjust control apparatus according to claim 3, wherein the height adjust start determining means compares the amount of shift of the vehicle height with a first predetermined value, and the height adjust start determining means uses as the integral a value obtained through integration of the amount of shift of the vehicle height that is greater than the first predetermined value.

5. A vehicle height adjust control apparatus according to claim 1, wherein the height adjust start determining means counts a number of times that an amount of shift of the vehicle height detected by the vehicle height detector from the target vehicle height exceeds a first predetermined value, and if the counted number of times becomes greater than a third predetermined value, the height adjust start determining means determines that vehicle height adjustment is to be started, and the first predetermined value used during the first period is smaller than the first predetermined value used after the first period.

6. A vehicle height adjust control apparatus according to claim 1, wherein the height adjust start determining means counts a number of times that an amount of shift of the vehicle height detected by the vehicle height detector from the target vehicle height exceeds a first predetermined value, and if the counted number of times becomes greater than a third predetermined value, the height adjust start determining means determines that vehicle height adjustment is to be started, and the third predetermined value used during the first period is smaller than the first predetermined value used after the first period.

7. A vehicle height adjust control apparatus according to claim 1, wherein the vehicle height adjust control means includes vehicle height changing control means for changing the vehicle height by operating the actuator, and end control means for ending the changing of the vehicle height by stopping operation of the actuator when the vehicle height detected by the vehicle height detector becomes substantially equal to the target vehicle height, and
   wherein the end control means includes first end control means for ending the changing of the vehicle height during vehicle height increasing control when the vehicle height detected by the vehicle height detector becomes greater than a value that is less by a fourth predetermined value than the target vehicle height, and second end control means for ending the changing of the vehicle height during vehicle height decreasing control when the vehicle height detected by the vehicle height detector becomes less than a value that is greater by a fifth predetermined value than the target vehicle height, and wherein the fifth predetermined value is greater than the fourth predetermined value.

8. A vehicle height adjust control apparatus according to claim 7, wherein the height adjust start determining means includes a setting element for changing the target vehicle height, and target vehicle height changing means for changing the target vehicle height in response to an operation of the setting element and outputting an instruction to start the vehicle height adjustment.

9. A vehicle height adjust control apparatus comprising:
an actuator that changes a vehicle height;
a vehicle height detector for detecting the vehicle height;
start instruction means for outputting an instruction to start vehicle height adjustment;
vehicle height changing control means for changing the vehicle height in response to the instruction from the start instruction means to start the vehicle height adjustment by operating the actuator so that the vehicle height detected by the vehicle height detector becomes substantially equal to a target vehicle height; and
end control means for ending the changing of the vehicle height for when the vehicle height detected by the vehicle height detector becomes substantially equal to the target vehicle height by stopping operation of the actuator, the end control means including first end control means for ending the changing of the vehicle height during vehicle height increasing control when the vehicle height detected by the vehicle height detector becomes greater than a value that is less by a first predetermined value than the target vehicle height; and second end control means for ending the changing of the vehicle height during vehicle height decreasing control when the vehicle height detected by the vehicle height detector becomes less than a value that is greater by a second predetermined value than the target vehicle height, the second predetermined value being greater than the first predetermined value.

10. A vehicle height adjust control apparatus according to claim 9, wherein the start instruction means includes a setting element for changing the target vehicle height, and target vehicle height changing means for changing the target vehicle height in response to an operation of the setting element and outputting the instruction to start the vehicle height adjustment.

11. A vehicle height adjust control apparatus according to claim 9, wherein the start instruction means includes integration means for integrating an amount of shift of the vehicle height detected by the vehicle height detector from the target vehicle height, and start determining means for comparing an integral of the amount of shift provided by the integration means with a fourth predetermined value and, if the integral is greater than the fourth predetermined value, outputting the instruction to start the vehicle height adjustment.

12. A vehicle height adjust control apparatus according to claim 11, further comprising: a vehicle engine start detector; wherein the vehicle engine start detector detects an engine start and the fourth predetermined value used by the start determining means during a first period immediately after detection of engine start is smaller than the fourth predetermined value used after the first period.

13. A vehicle height adjust control apparatus according to claim 12, wherein the integration means compares the amount of shift of the vehicle height with a third predetermined value, and integrates the amount of shift that is greater than the third predetermined value.

14. A vehicle height adjust control apparatus according to claim 9, wherein the start instruction means includes a counter that counts a number of times that an amount of shift of the detected vehicle height from the target vehicle height exceeds the third predetermined value, and start determining means for outputting the instruction to start the vehicle height adjustment if the counted number of times becomes greater than a fifth predetermined value.

15. A vehicle height adjust control apparatus according to claim 14, wherein a vehicle engine start detector detects an engine start and the third predetermined value used by the counter during a first period immediately after vehicle engine start is detected is smaller than the third predetermined value used after the first period.

16. A vehicle height adjust control apparatus according to claim 14, wherein a vehicle engine start detector detects an engine start and the fifth predetermined value used by the start determining means during a first period immediately after engine start is detected is smaller than the fifth predetermined value used after the first period.

17. A method of vehicle height adjustment control, comprising:
detecting a vehicle height;
comparing the vehicle height detected with a predetermined target vehicle height;
detecting a vehicle engine start;
comparing the amount of shift between the detected vehicle height and the target vehicle height against a first threshold during a first period immediately after detection of vehicle engine start;
start controlling adjustment of the vehicle height so that the detected vehicle height becomes substantially equal to the target vehicle height when the amount of shift is greater than the first threshold;
comparing the amount of shift between the detected vehicle height and the target vehicle height against a second threshold during a second period after lapse of the first period, the first threshold being smaller than the second threshold; and
start controlling adjustment of the vehicle height so that the detected vehicle height becomes substantially equal to the target vehicle height when the amount of shift is greater than the second threshold.

18. A method of vehicle height adjustment control, comprising:
detecting a vehicle height;
comparing the vehicle height detected with a predetermined target vehicle height;
starting vehicle height adjustment control in response to an instruction to start vehicle height adjustment so that the vehicle height detected becomes substantially equal to the target vehicle height;
ending vehicle height adjustment during a height increasing operation by stopping the operation when the detected vehicle height becomes greater than a value that is less by a first predetermined value than the target vehicle height; and
ending vehicle height adjustment during a height decreasing operation by stopping the operation when the detected vehicle height becomes less than a value that is greater by a second predetermined value than the target vehicle height, the second predetermined value being greater than the first predetermined value.

* * * * *